US007096210B1

(12) United States Patent
Kramer et al.

(10) Patent No.: US 7,096,210 B1
(45) Date of Patent: Aug. 22, 2006

(54) TRAINABLE, EXTENSIBLE, AUTOMATED DATA-TO-KNOWLEDGE TRANSLATOR

(75) Inventors: Kevin M. Kramer, Coon Rapids, MN (US); Steven C. Gaetjens, Brooklyn Park, MN (US); Harold C. Voges, Shoreview, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/522,483

(22) Filed: Mar. 10, 2000

(51) Int. Cl.
*G06F 17/00* (2006.01)
*G06N 5/00* (2006.01)
(52) U.S. Cl. .............................. 706/45; 706/11; 706/12
(58) Field of Classification Search .................. 706/45, 706/11, 12; 705/2
See application file for complete search history.

(56) References Cited

U.S. PATENT DOCUMENTS 5,359,509 A * 10/1994 Little et al. ..................... 705/2
6,236,977 B1 * 5/2001 Verba et al. ................... 705/10

FOREIGN PATENT DOCUMENTS

| JP | 62206628 | 9/1987 |
| WO | WO-9962002 | 12/1999 |

OTHER PUBLICATIONS

Apte, C., et al., "Towards Language Independent Automated Learning of Text Categorization Models", *Proceedings of the Annual International ACM-SIGIR Conference on Research and Development in Information Retreival*, Berlin, Germany, (Jul. 3-6, 1994), 23-30.

Clearwater, S. H., et al., "RL4: A Tool for Knowledge-Based Induction", *Proceedings of the IEEE International Conference on Tools for Artificial Intelligence*, Los Alamitos, CA,(Nov. 6-9, 1990), 24-30.

\* cited by examiner

*Primary Examiner*—Joseph P. Hirl
(74) *Attorney, Agent, or Firm*—Kris T. Fredrick

(57) ABSTRACT

A trainable, extensible, automated data-to-knowledge translator is described. One aspects of the present invention includes a computerized system having at least one repository to store user-specified rules that govern the processing of data by the computerized system and at least one processing module to process data according to the rules and to generate knowledge from the data. Another aspect of the present invention is a computerized method of translating data to knowledge. The computerized method includes providing user-specified rules to govern the behavior of a computerized system for translating data to knowledge, and processing data according to the rules to generate knowledge. A further aspect of the present invention is a computer readable medium having computer-executable instructions stored thereon for executing a method of translating data to knowledge. The computerized method comprises receiving data in an unstructured form, converting the data to a neutral form, processing data according to user-specified rules to translate the data from the neutral form to knowledge, and exporting the knowledge to a knowledge repository.

42 Claims, 32 Drawing Sheets

```
<MSTFLTAB>
   <FLTROW CHAPNBR="29" SECTNBR="24" CHG="N" KEY="EN29240001-00001001">
      <CHGDESC>ADDED WARNING/MALFUNCTION</CHGDESC>
      <CHGDESC>ADDED FAULT SYMPTOM</CHGDESC>
      <REVST>
      <FLTDESC SHTKEY="2900D5NL" FLTNBR="29000010-05150001" CATEG="ECAM" FLTYPE="UPPER ECAM DU WARNINGS">
         <FLTMSG>HYD Y ELEC PUMP LO PR</FLTMSG>
         <ATAECAM>2900</ATAECAM>
      </FLTDESC>
      <TASKREF>292400810801</TASKREF>
      <REVEND>
   </FLTROW>
</MSTFLTAB>
```

Figure 6

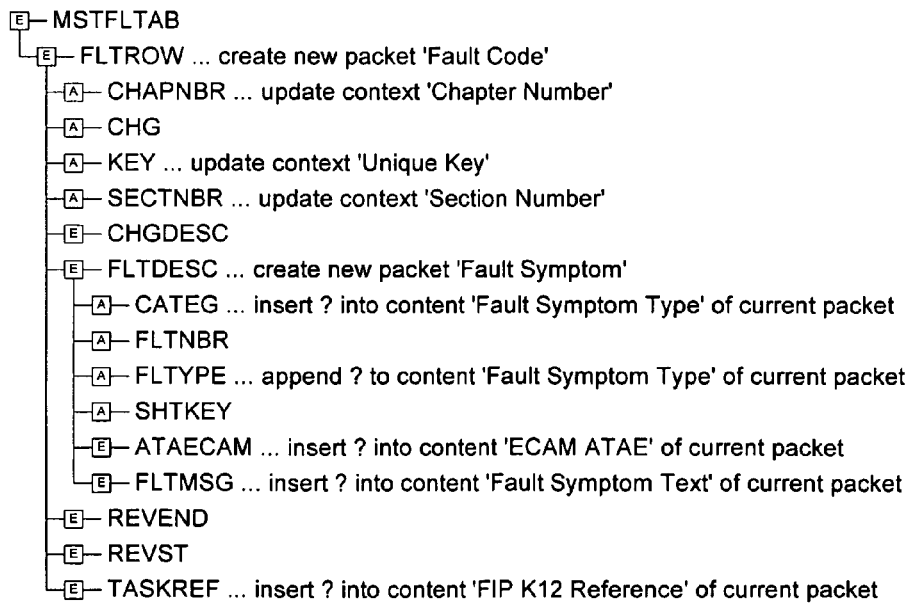

Figure 7

Type Fault Code
Content
Context
    Chapter Number    29
    Section Number    24
    Unique Key    EN29240001-00001001

Figure 8

Type Fault Code
Content
Context

Type Fault Symptom
Content
    Fault Symptom Type    ECAM UPPER ECAM DU WARNINGS
    Fault Symptom Text    HYD Y ELEC PUMP LO PR
    ECAM ATA    2900
Context
    Chapter Number    29
    Section Number    24
    Unique Key    EN29240001-00001001

Figure 9

| | |
|---|---|
| Type Fault Code | |
| Content | |
|     FIP K12 Reference | 292400810801 |
| Context | |
|     Chapter Number | 29 |
|     Section Number | 24 |

Figure 10

| Input Text |
| --- |
| IF THE PROBLEM CONTINUES, REPLACE THE L (R, C) WIDGET W121 (W122, W123) (DOC 21-51-11,-22,-33). |

Input Text

IF THE PROBLEM CONTINUES, REPLACE THE L (R, C)

FIN     FIN    FIN
WIDGET  W121 (W122, W123)  (21-51-11,-22,-33).
            EquipmentNumber
                Entity

Input Text

IF THE PROBLEM CONTINUES, REPLACE THE L (R, C)
                                     SEP   SEP
                            CS  SUB  SUB  SUB
WIDGET W121 (W122, W123) ( 21-51 -11 , -22 , -33 ).
                                 DocumentReference
                                     Entity

{ "DOC", "21-51", "-11" }

{ "DOC", "21-51", "-22" }

{ "DOC", "21-51", "-33" }

Figure 17

Volume = `DOC`, Bookmark = `DOC 21-51-11`

Volume = `DOC`, Bookmark = `DOC 21-51-22`

Volume = `DOC`, Bookmark = `DOC 21-51-33`

Figure 18

PemDocRef Table

| Id | EntityId | Volume | Bookmark | ChapterNumber | SectionNumber |
|---|---|---|---|---|---|
| 1 | 1 | DOC | DOC 21-51-11 | 21 | 51 |
| 2 | 2 | DOC | DOC 21-51-22 | 21 | 51 |
| 3 | 3 | DOC | DOC 21-51-33 | 21 | 51 |

Figure 24

PemDocRef Table

| Id | EntityId | Volume | Bookmark | ChapterNumber | SectionNumber |
|---|---|---|---|---|---|
| 1 | 1 | DOC | DOC 21-51-11 | 21 | 51 |
| 2 | 2 | DOC | DOC 21-51-22 | 21 | 51 |
| 3 | 3 | DOC | DOC 21-51-33 | 21 | 51 |

PemEquipNum Table

| Id | EntityId | EquipNum | ChapterNumber | SectionNumber |
|---|---|---|---|---|
| 1 | 1 | W121 | 21 | 51 |
| 2 | 2 | W122 | 21 | 51 |
| 3 | 3 | W123 | 21 | 51 |

PemFault Table

| Id | EntityId | Action | EquipDesc | ChapterNumber | SectionNumber |
|---|---|---|---|---|---|
| 1 | 1 | REPLACE | THE L (R, C) WIDGET | 21 | 51 |

PemFaultHasDocRef Table

| FaultKey | DocRefKey |
|---|---|
| 1 | 1 |
| 1 | 2 |
| 1 | 3 |

PemFaultHasEquipNums

| FaultKey | EquipNumKey |
|---|---|
| 1 | 1 |
| 1 | 2 |
| 1 | 3 |

Figure 25

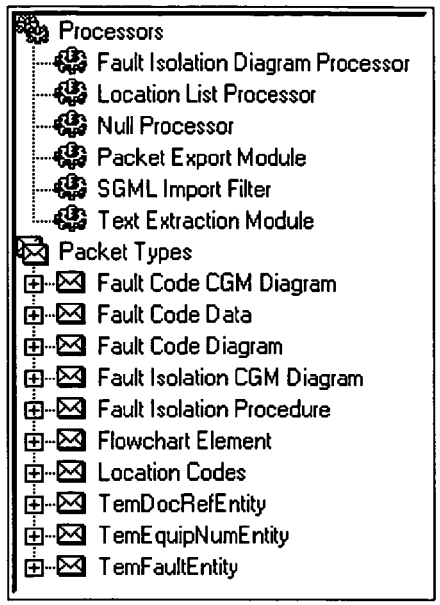

Figure 33

| Packet Type | Processor | Argument | Context |
|---|---|---|---|
| Fault Isolation Procedure | Packet Export Module | | None |
| Fault Isolation CGM Diagram | Packet Export Module | | None |
| Fault Isolation CGM Diagram | Fault Isolation Diagram Processor | Graphic Number | None |
| Flowchart Element | Text Extraction Module | "Faults" | Specified |
| Fault Code Diagram | Null Processor | | None |
| Fault Code CGM Diagram | Null Processor | | None |
| Fault Code Data | Location List Processor | Fault Code Description | None |
| Flowchart Element | Null Processor | | None |
| TemDocRefEntity | Packet Export Module | | None |
| TemEquipNumEntity | Packet Export Module | | None |
| TemFaultEntity | Packet Export Module | | None |
| Location Codes | Packet Export Module | | None |
| Fault Code Data | Text Extraction Module | "Faults" | None |

Figure 34

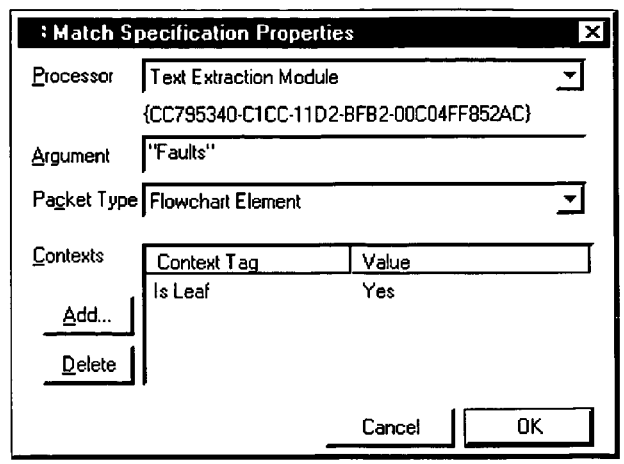
Figure 35
Figure 36. Dialog bar of the text extraction user interface.

| Token | | | | | | |
|---|---|---|---|---|---|---|
| Entity | Name | Abbr | Def | Bin | MatchEntity | |
| ▶ FLTs::FLTGEN | Fault Description | FDP | ☑ | 1 | <<n/a::n/a>> | |
| FLTs::FLTGEN | Fault Verb | VRB | ☐ | 1 | <<n/a::n/a>> | |
| FLTs::FLTGEN | Fault Equipment Number | FEN | ☐ | -1 | FLTs::EQP | |
| FLTs::FLTGEN | Fault Doc Ref | FDR | ☐ | -1 | FLTs::DRF | |
| * | | | ☐ | | | |

Figure 39

| Table Name | Field Name | Type | Length |
|---|---|---|---|
| rawFaultIsolationProcedure | ●Id | SQL_INTEGER | 4 |
| rawFaultIsolationCgmDiagram | ●FaultCode | SQL_VARCHAR | 12 |
| ✗ rawLocCode | ●FaultCodeDescr... | SQL_VARCHAR | 255 |
| ●rawFaultCode | ●FaultCodeKey | SQL_VARCHAR | 32 |
| rawFaultHasEquipNums | ●ChapterNumber | SQL_VARCHAR | 3 |
| rawFaultHasDocRefs | ●SectionNumber | SQL_VARCHAR | 3 |
| rawFault | ●SubjectNumber | SQL_VARCHAR | 3 |
| rawEquipNum | | | |
| rawDocRef | | | |

Import   Purge

Figure 40

TRAINABLE, EXTENSIBLE, AUTOMATED DATA-TO-KNOWLEDGE TRANSLATOR

FIELD OF THE INVENTION

The present invention is related to computer systems and in particular to computer systems to translate data to knowledge.

BACKGROUND OF THE INVENTION

Many products such as decision support systems require knowledge in order to make intelligent decisions. A decision support system is a computer-based system that combines knowledge, analytical tools, and models to aid a decision maker. A decision support system commonly includes a knowledge database or a knowledge repository. Knowledge is extracted from the knowledge database or repository and analyzed using the analytical tools and models in order to assist with decisions. In order to be useful to the decision support system, data must be analyzed, translated and organized into structured, meaningful knowledge before it is stored in the knowledge database.

Often, data is in the form of human readable documentation, which to the decision support system appears as unstructured, meaningless data. Data refers to information, raw facts, and the like. Data may exist in a variety of forms such as in paper documents or in digital documents. Data on its own has no meaning to a decision support system. For a decision support system to process data, the data must first be translated into a form that the decision support system can process.

As used herein, knowledge refers to information that can be processed by a decision support system. A collection of knowledge is referred to as a knowledge base or a knowledge repository. Even structured data formats such as the standard generalize markup language (SGML) or the extendible markup language (XML) may be unsuitable to the decision support system since not all of the needed knowledge may be tagged by markup. Human translation of data to knowledge is laborious, expensive, and error-prone; especially for data sources that are periodically updated. Special purpose knowledge base construction programs are often too inflexible to directly apply, or too costly to modify for new types of data and/or knowledge repositories.

What is needed is a way to convert unstructured, meaningless data, such as human consumable information, into structured, meaningful knowledge, i.e., machine consumable knowledge.

SUMMARY OF THE INVENTION

A trainable, extensible, automated data-to-knowledge translator is described. One aspect of the present invention includes a computerized system having at least one repository to store user-specified rules that govern the processing of data by the computerized system and at least one processing module to process data according to the rules and to generate knowledge from the data. Another aspect of the present invention is a computerized method of translating data to knowledge. The computerized method includes providing user-specified rules to govern the behavior of a computerized system for translating data to knowledge, and processing data according to the rules to generate knowledge. A further aspect of the present invention is a computer readable medium having computer-executable instructions stored thereon for executing a method of translating data to knowledge. The computerized method comprises receiving data in an unstructured form, converting the data to a neutral form, processing data according to user-specified rules to translate the data from the neutral form to knowledge, and exporting the knowledge to a knowledge repository.

BRIEF DESCRIPTION OF THE DRAWINGS

FIG. 6 shows example source data to be applied to an import filter of one embodiment of the present invention such as the import filter shown in FIG. 2.

FIG. 7 shows example import filter rules to be applied to the example source data of FIG. 6.

FIG. 8 shows an example embodiment of a first packet produced by applying the example import filter rules shown in FIG. 7 to the sample source data shown in FIG. 6.

FIG. 9 shows an example embodiment of a second packet produced by applying the example import filter rules shown in FIG. 7 to the sample source data shown in FIG. 6.

FIG. 10 shows an alternate example embodiment of the first packet shown in FIG. 8 produced by applying the example import filter rules shown in FIG. 7 to the sample source data shown in FIG. 6.

FIG. 17 illustrates the sets of token values formed by performing a full expansion on the bins of FIG. 16.

FIG. 18 illustrates the field labels and values resulting from applying the matched production's Volume and Bookmark formats to the sets of values of FIG. 17.

FIG. 24 is an example table after exporting the TemDocumentReferenceEntity packets of FIG. 19.

FIG. 25 shows five example tables after exporting the packets of FIG. 19.

FIG. 33 is one embodiment a processor and packet selection panel of a packet dispatcher user interface.

FIG. 34 is one embodiment of a match specification panel of a packet dispatcher user interface.

FIG. 35 is a "Match Specification Properties" dialog box of one embodiment of a packet dispatcher user interface.

FIG. 36 is one embodiment of a dialog bar of a text extraction user interface.

FIG. 39 is a screen capture of one embodiment of a grid panel.

FIG. 40 is a screen capture of one embodiment of a knowledge repository schema import control.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

System Level Overview

Figure 1A:
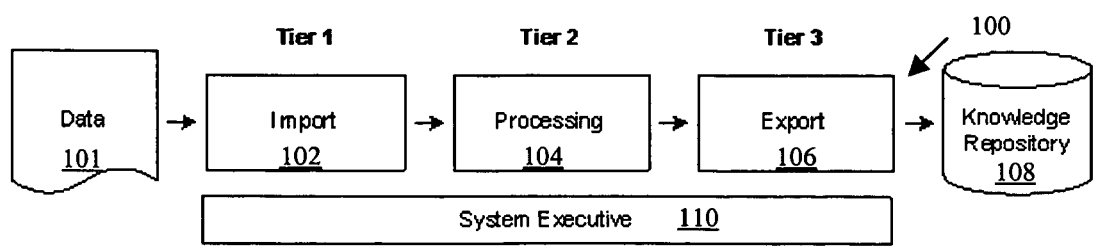
FIG. 1A is a high level block diagram of a Data-to-Knowledge translator system according to one embodiment of the invention.

FIG. 1A is a high level block diagram of a Data-to-Knowledge translator system 100 according to one embodiment of the invention. Due to the wide variation in data input formats and knowledge output requirements, the logical architecture of one embodiment of the Data-to-Knowledge (D2K) system of the present invention is a three-tiered system that isolates the data source input and the knowledge repository output as shown in FIG. 1A. The software components in tier one 102 import the source data 101 to a neutral format. Once the data is in a neutral format, the software components in tier two 104 analyze, organize, and process the data. Finally, the software components in tier three 106 export the processed data (knowledge) to a knowledge repository 108, where, if desired, further processing may occur. This three-tiered architecture maximizes the D2K system's extensibility by reducing the amount of development needed to apply the tool to a specific data format or an entirely different domain. Each tier is separated by well-defined interfaces so that internal changes to one tier do not necessitate changes to adjacent tiers. In addition to the three tiers, the D2K system contains a system executive 110, which provides global functions such as coordinating the activity within and between each one of the three tiers as well as interactions with the user and error reporting.

However, the D2K system is not limited to a three tier system. In an alternate embodiment, one or more additional tiers may be added to the logical architecture of the D2K translator system 100 shown in FIG. 1. In still another embodiment, the logical architecture can be scaled to operate as two tiers or even as a single tier.

Figure 1B:
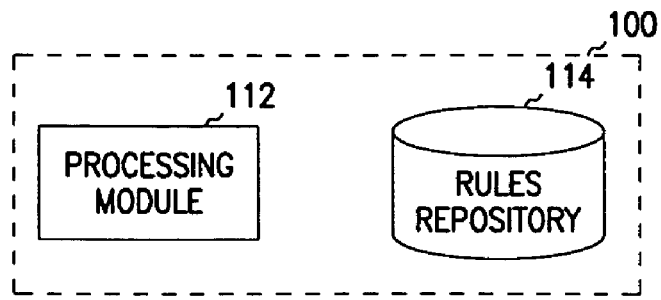
FIGS. 1B, 1C, and 1D are a high level block diagrams of alternate embodiments of a D2K translator system.

FIG. 1B is a high level block diagram of an alternate embodiment of a D2K translator system 100. As shown in FIG. 1B, the D2K translator system 100 comprises at least one repository 114 to store user-specified rules that govern the processing of data by the computerized system 100. The D2K translator system 100 also comprises at least one processing module 112 to process data according to the rules and to generate knowledge from the data.

Figure 1C:
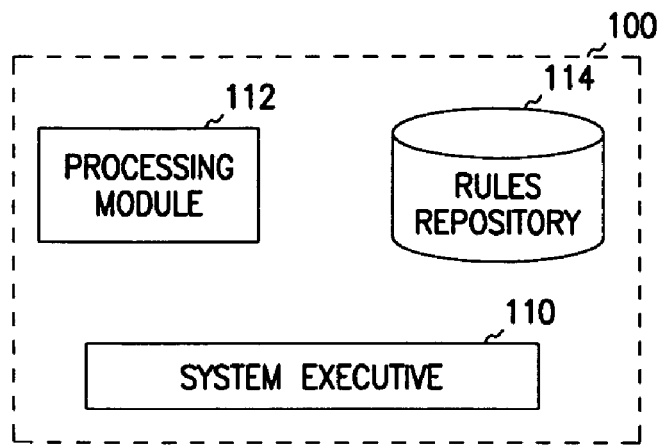

FIG. 1C is a high level block diagram of an additional embodiment of a D2K translator system 100. As shown in FIG. 1C, the D2K translator system 100 comprises at least one repository 114 and at least one processing module 112. The D2K system further comprises a system executive 110 to control the at least one repository and the at least one processing module.

Figure 1D:
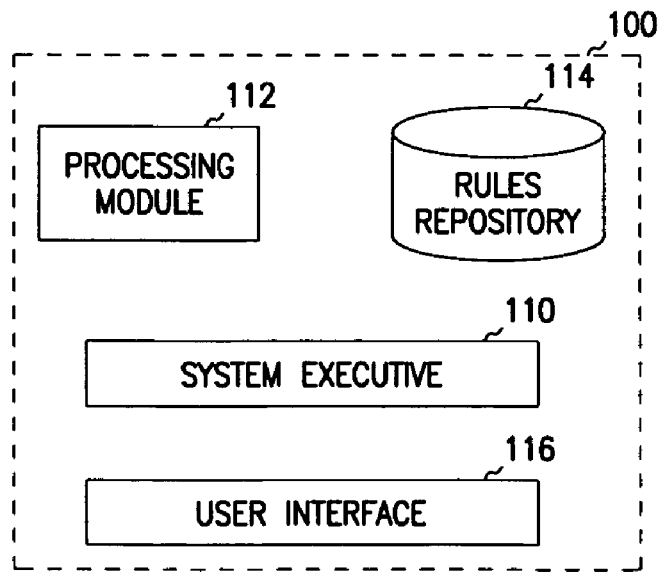

FIG. 1D is a high level block diagram of another embodiment of a D2K translator system 100. As shown in FIG. 1D, the D2K translator system 100 comprises at least one repository 114, at least one processing module 112, and a system executive 110. The D2K translator system also comprises a user interface to allow a user to create, modify, and delete the user-specified rules.

Many data formats exist for the source data 101. Unstructured data may be in the form of, but are not limited to, documents, pictures, databases, diagrams, schematics, and the like. Since, in general, it is not always possible (or convenient) to convert data into a single format, the D2K system supports a variety of source data formats. The components in tier one 102 process data in its native format and convert the relevant information into a neutral format. In other words, the import tier (tier one) 102 isolates the details and intricacies of the source data format from the processing components in the processing tier (tier two) 104. The routines in tier two 104 analyze, organize and process the imported data. The processing routines 104 convert unstructured, meaningless data into structured, meaningful knowledge. The processing components use a variety of techniques such as regular expression search engines, natural language processing algorithms and graphics identification algorithms. The components in tier three 106 export knowledge to a knowledge repository 108. Just as data may reside in many source formats, knowledge may also be represented in several repository formats. Hence, the export tier 106 (tier three) isolates the details and intricacies of the knowledge repository format from the processing routines. In summary, the import tier 102 and export tier 104 components allow the processing tier 106 components to perform their task without having to consider the format of the data source or the knowledge repository.

Physical Architecture for an Example Embodiment

Figure 2:
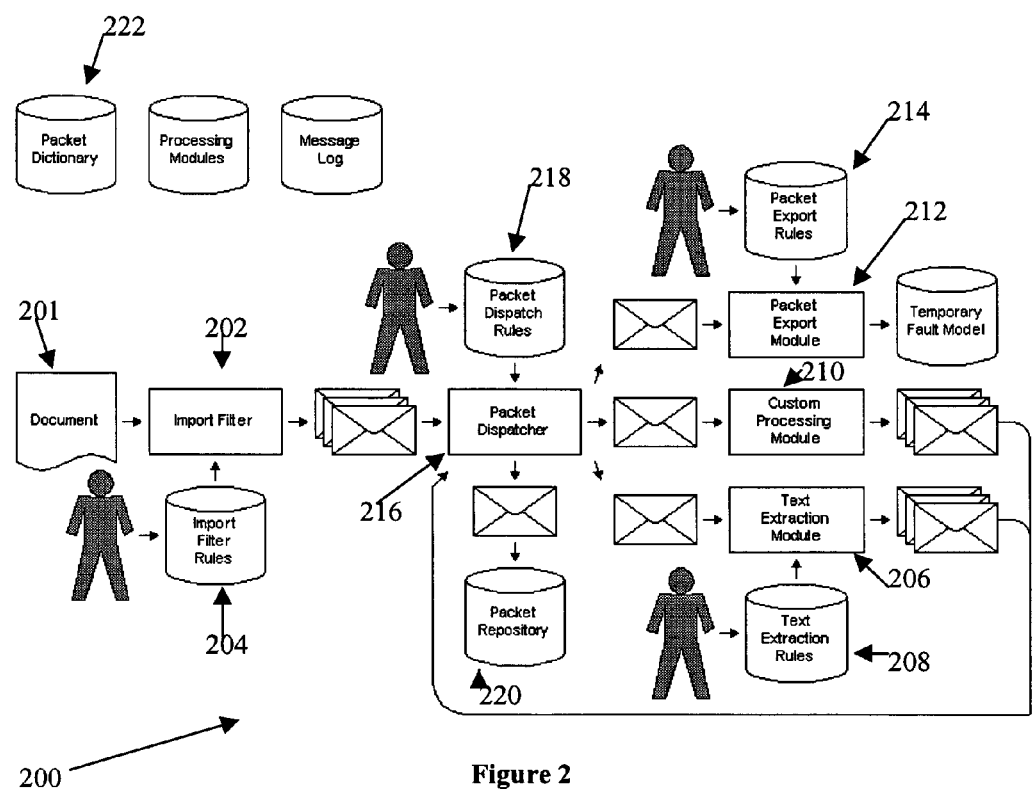
FIG. 2 is a block diagram of an example embodiment of a physical architecture to implement the Data-to-Knowledge translator (D2K) system shown in FIG. 1.
Figure 3:
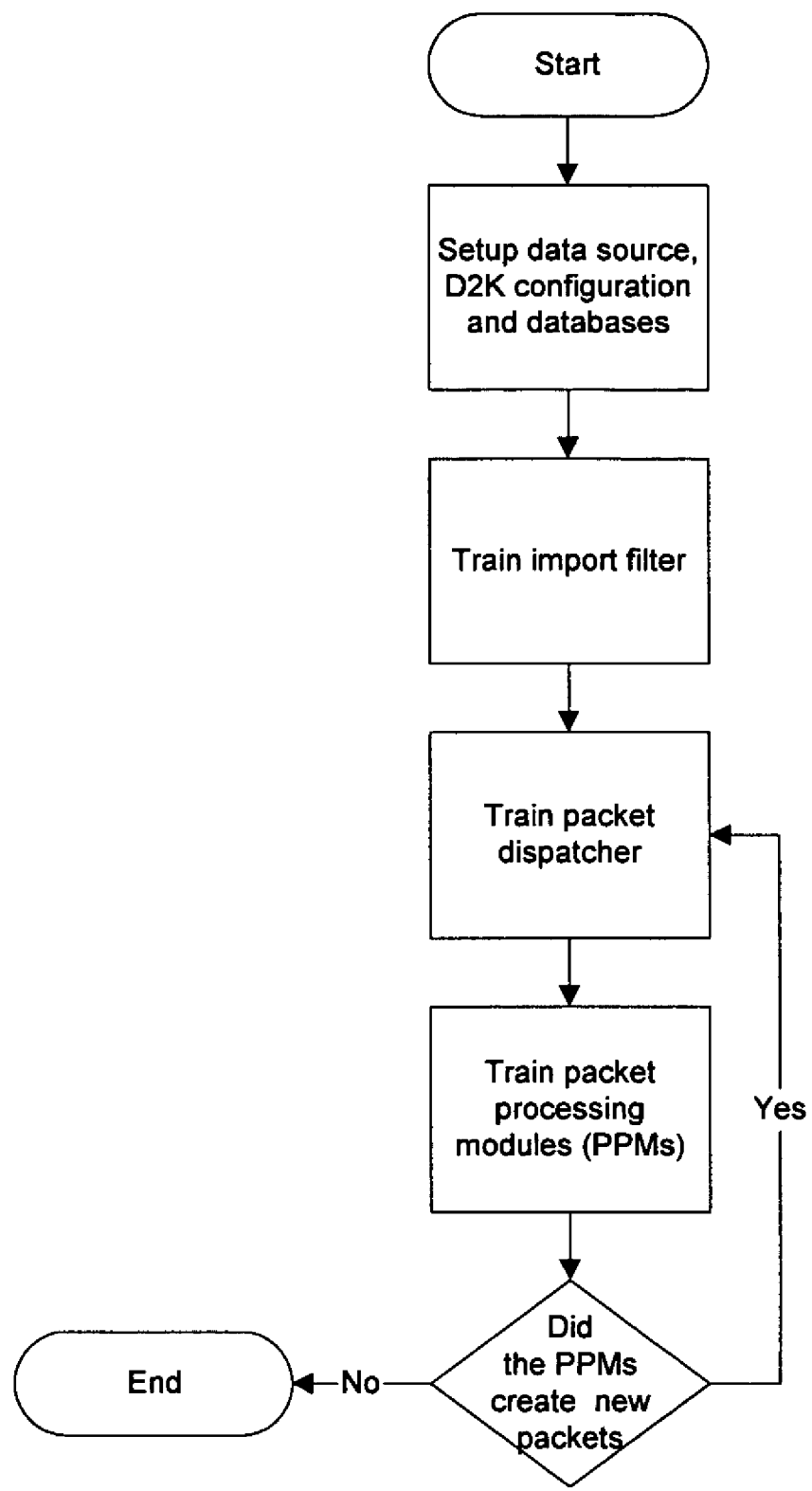
FIG. 3 is a flow chart of a process of training the D2K translator according to one embodiment of the invention.

FIG. 2 is a block diagram of an example embodiment of a physical architecture to implement the D2K system shown in FIG. 1. The rectangles 202, 206, 212, 210, 216 shown in FIG. 2 represent transformation components. The transformation components receive some type of input and transform it to produce some type of output. The envelopes shown in FIG. 2 represent data structures referred to herein as "packets". Packets are the interface mechanism that the transformation components use to communicate with each other. The cylinders shown in FIG. 2 represent repositories that store a variety of information such as the D2K system's configuration, rules that govern the transformation components' behavior, training data, error messages, and the like. Finally, the people shown in FIG. 2 represent graphic user interfaces (GUIs). The user interacts via the GUIs to customize the D2K system's behavior.

The example physical architecture shown in FIG. 2 maps to the logical architecture shown in FIG. 1 as follows. The import filter 202 along with the import filter rules repository 204 comprise the import tier (tier one) shown in FIG. 1. The text extraction module 206 along with the text extraction rules repository 208 and the custom processing modules 210 comprise the processing tier (tier two) shown in FIG. 1. The packet export module 212 along with the packet export rules repository 214 comprise the export tier (tier three) shown in FIG. 1. The packet dispatcher 216 along with the packet dispatch rules repository 218, the GUIs and configuration modules (not shown) comprise the system executive shown in FIG. 1. Packets are the interface objects that facilitate communication between and within the three tiers shown in FIG. 1.

Figure 4:
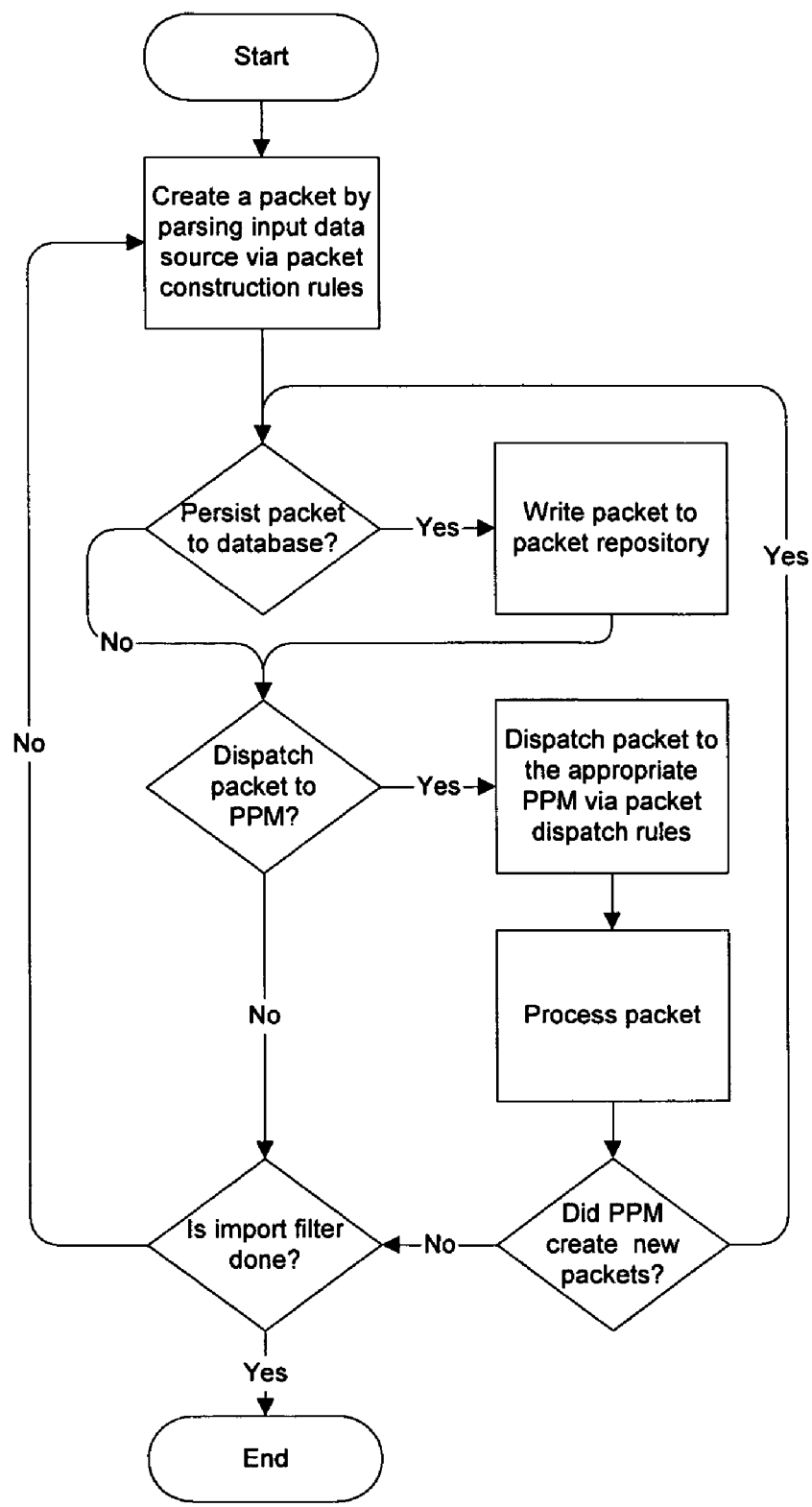
FIG. 4 is a flow chart of a process of parsing a data source to construct a knowledge base with the D2K translator according to one embodiment of the invention.

The data flow of the example embodiment of the D2K system 200 shown in FIG. 2 is as follows. The import filter 202 reads the data source 201 and discretizes it into packets according to the import filter rules 204. The import filter 202 then passes these packets to the packet dispatcher 216, which dispatches the packets to the appropriate processing modules according to the packet dispatch rules 218. The processing modules process packets. Some processing modules, such as the packet export module 212 are terminal processing modules that do not create additional packets. Other processing modules, such as the text extraction module 206, create several packets of finer resolution. These non-terminal processing modules pass the packets they create to the packet dispatcher 216, which, in turn, dispatches the packets to the appropriate processing modules and the cycle continues. In one embodiment, at least one terminal processing module exports packets to the knowledge repository. This process is illustrated in FIG. 4. The process shown in FIG. 4 continues until the entire data source is parsed.

System Components an Example Embodiment

This section describes in more detail the following system components of the example embodiment shown in FIG. 2: packets, the packet dictionary, the packet factory, the import filter, the packet dispatcher, packet processing modules, the text extraction module, the packet export module, computer graphic metafile (CGM) processing modules and the message log.

Figure 5:
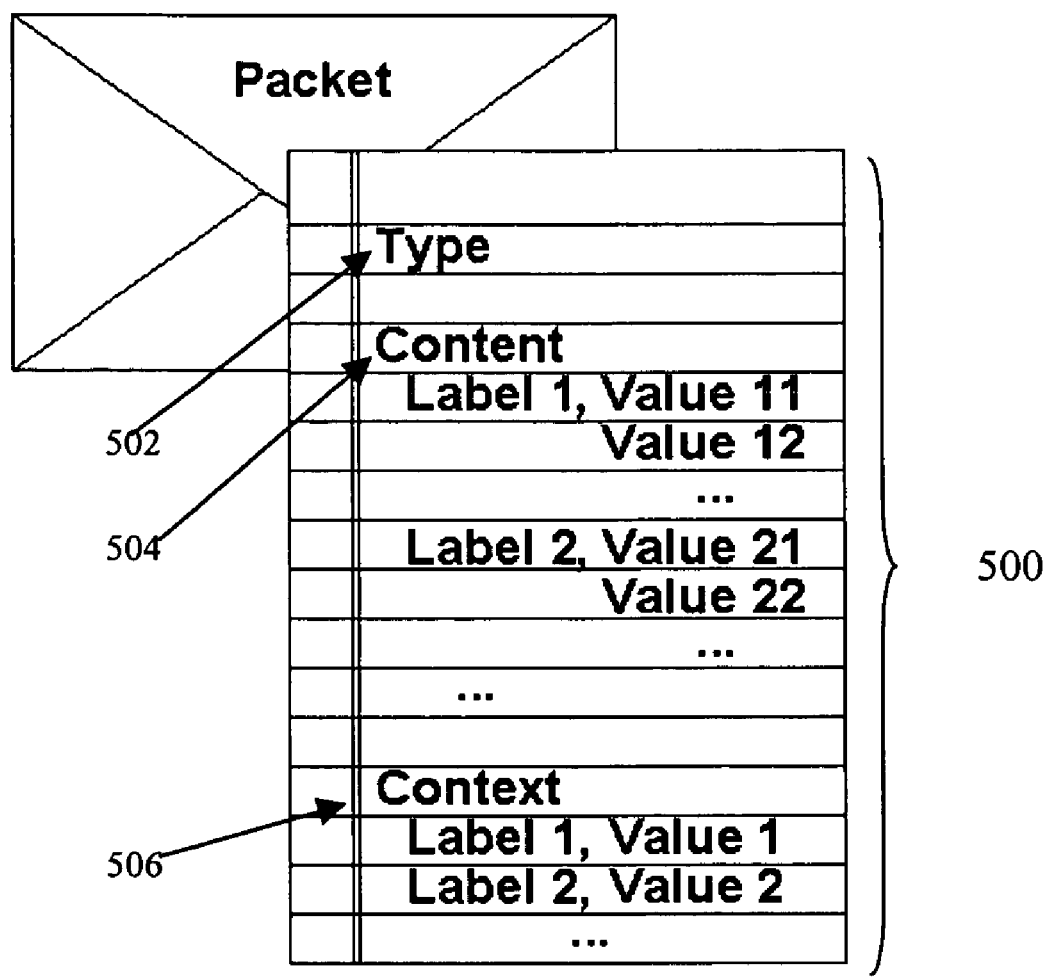
FIG. 5 is a more detailed diagram of one embodiment of a packet data structure for the packets shown in FIG. 2.

Packets. The packets shown in FIG. 2 are generic collections of information. FIG. 5 is a more detailed diagram of the packet data structure shown in FIG. 2. A packet 500 is a data structure containing fields for a type, content, and context as shown in FIG. 5. The packet's type 502 is a name of an entity or object. The type is typically descriptive of the packet's content. The packet's content 504 consists of zero or more labels, each having zero or more associated values. Content labels are relevant attributes of the entity or object. Content values are typically processed by packet processing modules and/or exported to the knowledge repository. Packet context 506, on the other hand, consists of zero or more labels, each having zero or one associated value. Context values contain information that either augments the content meaning or describes how the content was generated. Like content values, context values can also be exported to the knowledge repository.

When a processing module creates a child packet, it usually copies the parent's context and assigns it to the child. In other words, the child inherits the parent's context. Consequently, if it is desirable to identify packets with a unique identifier, then one can store the identifier as context. Since the children packets will inherit their parent's unique identifier, a relationship between parent and children packets will be created.

As an example, consider how one could represent a recipe as a packet. Since the packet type is descriptive of the packet content and the packet represents a recipe, the word "recipe" is an obvious choice for the packet's type. The relevant attributes of all recipes are a name, a list of ingredients, and preparation/cooking instructions. Consequently, our recipe packet will contain name, ingredients and instructions content. The name content will contain a single value, the recipe's name. The ingredients and instructions content, on the other hand, will contain multiple values. In other words, each ingredient and instruction step will be stored as separate values of the ingredients and instructions content respectively. Finally, information such as the number of servings, the number of calories per serving and nutritional information could be stored as context.

In one embodiment, packets are created by an import filter such as the import filter 202 shown in FIG. 2. The import filter passes the packet to a packet dispatcher such as the packet dispatcher 216 shown in FIG. 2. The packet dispatcher routes packets to packet processing modules, which, in turn, may create additional packets whose information is more atomic. The dispatcher may also store the packet in a packet repository such as the packet repository 220 of FIG. 2. Ultimately, all atomic packets are routed to a terminal packet processing module such as the packet export module 212 of FIG. 2, which exports packets to a knowledge repository, or to a null processor which discards the packets.

Packet Dictionary. In one embodiment, a packet dictionary, such as the packet dictionary 222 shown in FIG. 2, maintains a master list of legal packets. Several D2K system functions use the packet dictionary to mitigate data corruption. For instance, in some embodiments the training user interfaces use the packet dictionary to limit list box selections in order to prohibit the user from generating invalid training rules, while in other embodiments the packet factory uses the packet dictionary to guarantee that only legal packets are created.

The packet dictionary is populated during the registration of the D2K system import filters and packet processing modules. In one embodiment, any D2K system component that generates packets registers a prototype of each type of packet it can create. Conceptually, a packet prototype is a packet without any values. In other words, the packet prototypes specifies which content and context labels are legal for a given packet type.

Packet Factory. The purpose of the packet factory is to provide a set of packet related services such as reading a packet from the packet repository and writing a packet to the packet repository. In addition, the packet factory provides the service of instantiating packets, which were persisted in the packet repository, and passing them to the content dispatcher so that they can be routed to packet processing modules. Finally, the packet factory provides several services to build packets as well as a mechanism to clone the context of a packet in order to create a new child packet that inherits its parent's context.

Import Filter. In one embodiment, an import filter along with the import filter rules repository comprise tier one of FIG. 1. The purpose of an import filter, such as the import filter 202 shown in FIG. 2, is to handle the intricacies of the data format and hide these details from the processing modules. The import filter discretizes the relevant source data into packets, which are in the neutral data format of the D2K system. Depending upon the data source, the mechanism by which this process occurs is different. For example, for hierarchically structured data such as SGML or XML, packet construction rules may be associated to each node of the hierarchy. In another example embodiment, for data stored in Microsoft Word® documents, Visual Basic for Applications® scripts may be written to create packets.

An outline of the data's structure is captured and stored in a database. In the case of SGML documents, the outline is similar to the document tag definition (DTD) in that it contains a hierarchy of elements and attributes. In one embodiment, however, the outline only contains the portion of the DTD that is realized in the actual document.

Once the data structure is outlined, a packet construction rule is applied to each node in the hierarchy according to one embodiment of the present invention. Packet construction rules allow the user to do the following with the data that corresponds to the node.

1. Ignore the data.
2. Ignore the data and create a new packet.
3. Create a new packet and insert the data into the packet as content.
4. Insert the data into the current packet as content.
5. Append the data into the current packet as content.
6. Insert the data into the current packet as context.

In one embodiment, depending upon the rule, the user may also specify the packet type, the content label, and/or the context label. Furthermore, the six rules may not be applicable to every node in the hierarchy. For example, it is invalid to insert data into the current packet as content at a node which does not have an ancestor that creates a packet. (Note, the user need not be cognitive of all of the restrictions since in one embodiment, the import filter training user interface will not allow the user to violate any restrictions.)

As previously mentioned, once a data source's outline is stored in a database, a packet construction rule is associated to each node in the hierarchy. The type of rule is dependent upon the existing information in the import filter rules repository. If a given node already exists in the rules repository, then it is assigned the same rule as the existing node. If the node does not already exist in the database, then it is assigned the "ignore the data" rule. In essence, the user is able to merge the structure of several data sources without losing past training, i.e., the application of rules to nodes. In addition, the user is given the ability to delete any nodes that exist in the rules repository but not in the recently outlined data source. These two mechanisms allow the user to store the packet construction rules for several data sources in one or more rule repositories while minimizing training requirements.

In one embodiment, after the import filter is trained, the import filter is registered. Registering the import filter populates the packet dictionary with prototypes of packets that the import filter can create while it is parsing the data source. In one embodiment, after the user trains the import rules via the import filter user interface, the GUI automatically registers the import filter. Once the import filter is registered, the import filter may parse a data source by applying the packet construction rules to construct packets.

As an example, consider the sample SGML text shown in FIG. 6. FIG. 6 shows example source data to be applied to an import filter of the present invention. FIG. 7 shows example import filter rules to be applied to the example source data shown in FIG. 6. As shown in FIG. 7, elements are identified by a boxed letter 'E'; whereas, attributes by a boxed letter 'A'. The element and attribute names immediately follow the boxed letter and the import filter rules follow the ellipsis. The "ignore the data" rule is implied for items without an explicit rule.

The SGML import filter parses the sample text element by element applying the appropriate import filter rules (also referred to as "packet construction rules"). In the sample SGML text shown in FIG. 6, the import filter first parses the master fault table (MSTFLTAB) element. Since the rule in FIG. 7 that corresponds to this element is to ignore the element's data, the import filter proceeds to parse the fault row (FLTROW) element. The rule in FIG. 7 that corresponds to this element instructs the import filter to create a packet of type Fault Code. Next, the import filter parses the FLTROW element's attributes. The rules in FIG. 7 that correspond to the chapter number (CHAPNBR), section number (SECTNBR) and unique key (KEY) attributes direct the import filter to add three context label-value pairs to the Fault Code packet. The values of the CHAPNBR, SECTNBR and KEY attributes, i.e., "29", "24" and "EN29240001-00001001", become the values of the Chapter Number, Section Number and Unique Key context respectively as shown in the packet of FIG. 8. FIG. 8 is a snapshot of the Fault Code packet prior to the import filter parsing the fault description (FLTDESC) element of the SGML text of FIG. 6. Since the rules that correspond to the next three elements instruct the parser to ignore the element's data, the import filter proceeds to parse the fault description (FLTDESC) element.

The rule in FIG. 7 that corresponds to the FLTDESC element instructs the import filter to create a second packet of type Fault Symptom. Next, the import filter inserts the value of the category (CATEG) attribute into the Fault Symptom packet shown in FIG. 9 as Fault Symptom Type content. The value of the fault type (FLTYPE) attribute is then appended to the current value of the Fault Symptom Type content. If the rule, which corresponds to the FLTYPE attribute, instructed the import filter to insert, rather than append, the attribute's data to the Fault Symptom Type content, then the import filter would have inserted this data as a second value. After parsing the FLTDESC element and its attributes, the import filter parses the fault message (FLTMSG) and ATA ECAM (ATAECAM) elements. The import filter inserts the value of these elements into the Fault Symptom-packet as Fault Symptom Text and ECAM ATA content as shown in FIG. 9. Next, the import filter encounters the FLTDESC end tag. Consequently, it clones the context of the Fault Symptom's parent packet, i.e., the Fault Code packet, and passes the Fault Symptom packet to the packet dispatcher. FIG. 9 is a snapshot of the Fault Symptom packet after the import filter encounters the fault description (FLTDESC) end tag in the sample SGML text of FIG. 6.

Upon returning from the packet dispatcher, the import filter parses the task reference (TASKREF) element of the SGML text of FIG. 6. The import filter inserts the value of this element in the Fault Code packet as FIP K12 Reference content as shown in FIG. 10. The import filter ignores the next element and then encounters the FLTROW end tag. Upon encountering this tag, the import filter passes the Fault Code packet to the content dispatcher. Upon returning from the packet dispatcher, the import filter encounters the MSFLTAB end tag and terminates. FIG. 10 is a snapshot of the Fault Code packet after the import filter encounters the fault row (FLTROW) end tag in the sample SGML text of FIG. 6. In summary, applying the packet construction rules of FIG. 7 to the sample SGML text of FIG. 6 produces a Fault Code packet as shown in FIG. 10 and a Fault Symptom packet as shown in FIG. 9.

Packet Dispatcher. A packet dispatcher, such as the packet dispatcher 216 of FIG. 2, is the hinge point between the front half (i.e., the import tier) and back half (i.e., processing tier and export tier) of the D2K system and functions as a packet 'traffic cop'. In one embodiment, the packet dispatcher operates in three modes. In its normal mode of operation, the packet dispatcher routes packets to packet processing modules according to packet match specification rules, which are stored in a packet dispatch rules database, such as the Packet Dispatch Rules database 218 of FIG. 2. In a second mode, the user can disable packet dispatching and configure the packet dispatcher to merely save packets to a packet repository, such as the packet repository 220 of FIG. 2. In a third mode, the user can configure the packet dispatcher both to dispatch packets to packet processing modules and to store packets in the packet repository. This last mode is useful as a debugging aid and provides the user with a packet audit trail.

In one embodiment, the packet dispatcher supports two modes of the sequencing between the import filter, the packet dispatcher, and the packet processing modules: single-threaded and multi-threaded. In single-thread mode, the import filter generates a packet and passes it to the packet dispatcher, who passes it to an appropriate packet processing module. The packet processing module processes the packet and may, in turn, generate additional packets, which are referred to as children packets. Next, the packet processing module sequentially passes each child packet to the packet dispatcher, who passes it to an appropriate processing module. This cycle continues until all of the relevant information in the original information has been processed and exported. At this point, the import filter is free to resume parsing the input data in order to generate another packet. In summary, in the single-thread mode of operation, once the import filter generates a packet, it waits until this packet as well as all of its descendent packets are processed before it can resume its task of parsing the input data. In multi-threaded mode, the import filter does not have to wait for the dispatcher to process the packet before resuming its processing. The raw packets are queued in the packet dispatcher and processed serially by a second execution thread. This allows the import filter to work continuously. Multi-threaded operation is advantageous when the D2K system is hosted on a multi-processor computer system.

As mentioned previously, the packet dispatcher routes packets to packet processing modules according to packet match specification rules stored in the packet dispatch rules database. In one embodiment, the packet match specification rules map packet match specifications (referred to herein as matchspecs) to packet processing modules (referred to as packet processors). Matchspecs consists of a packet type, an optional processing argument, and zero or more context label-value pairs. Matchspecs are similar to packets with the following two exceptions.

Matchspecs contain a packet processor argument.

Matchspecs do not contain content.

In one embodiment, packet processing modules, except for the null processor module, are specified by their global unique identifier (GUID). Processing modules without a GUID are assumed to be null processor modules.

Figures 11, 12:
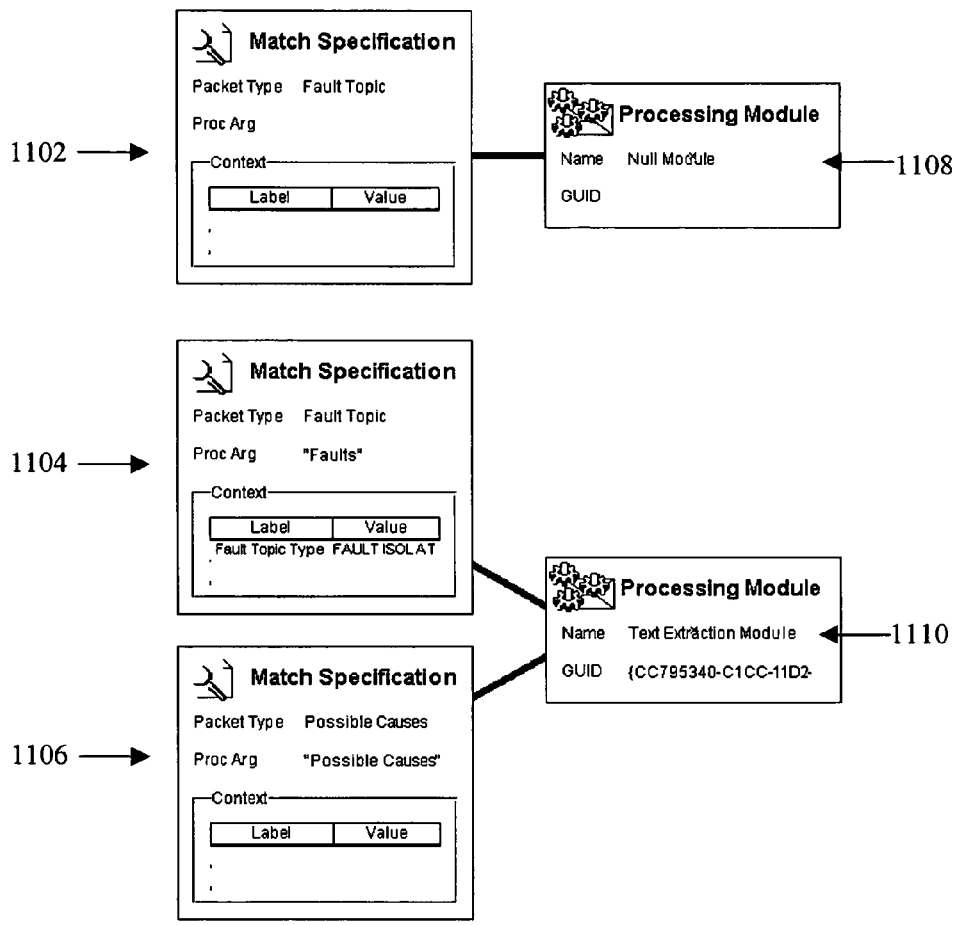
FIG. 11 illustrates example patent match specification rules for use by the packet dispatcher of FIG. 2.
FIG. 12 is sample input text that is to be processed by a text extraction module of FIG. 2.

FIG. 11 illustrates example packet match specification rules for use by a packet dispatcher. In FIG. 11, three matchspecs 1102, 1104, 1106 are mapped to two packet processors 1108, 1110. The first matchspec 1102 indicates that the Null Module 1108 can process all packets of type Fault Topic. The second matchspec 1104 indicates that the Text Extraction Module 1110 with the argument "Faults" can process packets of type Fault Topic whose Fault Topic Type context is equal to FAULT ISOLATION. The third matchspec 1106 indicates that the Text Extraction Module 1110 with the argument "Possible Causes" can process all packets of type Possible Causes. In one embodiment, the following guidelines apply to matchspecs:

A matchspec must map to one and only one packet processor.

Several matchspecs may map to the same packet processors.

Matchspecs with the same packet type may map to different packet processors as long as they have different context label-value pairs.

In order to determine which packet processors should process a packet, the packet dispatcher first determines which matchspecs match a packet. Then, from this list, the packet dispatcher determines the best matchspecs. In order for a matchspec to match a packet, two requirements must be met. First, the matchspec must be of the same type as the packet. Second, the matchspec's context, if it exists, must be present in the packet. The proceeding statement does not imply that a packet has to have all of the same context as the matchspec in order for the matchspec to match. A packet, which has context that is not present in a matchspec, will still match the matchspec as long as the packet has the context specified by the matchspec. In other words, the packet's context must be a superset of the matchspec's context in order to match. Once the packet dispatcher determines a list all of the matchspecs that match a packet, it chooses the matchspecs, which have the most context, as the best. Once the best matchspecs are determined, the packet dispatcher passes the packet and the corresponding processing arguments to the packet processors that are mapped to the best matchspecs.

For example, consider the illustration shown in FIG. 11. Packets of type Fault Topic with Fault Topic Type context equal to FAULT CONFIRMATION will only be matched by the first matchspec 1102. Subsequently, these packets will be dispatched to the Null Module 1108. Packets of type Fault Topic with Fault Topic Type context equal to FAULT ISOLATION will be matched by both the first matchspec 1102 and second matchspec 1104. The packet dispatcher will dispatch this packet to the Text Extraction Module 1110 with an argument of "Faults" since the second matchspec 1104 has more context label-value pairs than the first matchspec.

Packet Processing Modules. The purpose of packet processing modules, or packet processors as they are also referred to, is to analyze, organize and process packets. In one embodiment, packet processors may be classified into two groups: generic packet processors and custom packet processors. Generic packet processors are those that will likely be used regardless of the data source. Custom packet processors, on the other hand, are data source specific. In addition, packet processors may also be categorized as terminal or non-terminal. Terminal packet processors are packet consumers. They process packets but do not generate child packets. Non-terminal packet processors are packet producers. They process packets and generate child packets.

In one embodiment of the invention, there are three generic packet processors: a text extraction module, a packet export module, and a null module. The text extraction module and packet export modules will be discussed in detail in the following sections. The null processor is a terminal packet processor. The null processor does not process packets. Its purpose is simply to consume packets. In one embodiment, the null processor is also unique in that is does not have an implementation. The packet dispatcher effectively performs its function. Instead of routing packets to a physical null processor, the packet dispatcher simply destroys them.

In one embodiment, before packet processors can analyze, organize and process packets, they are registered. Packet processor registration accomplishes two things. First, a record, which corresponds to the packet processor, is inserted into the processing module repository if one does not already exist. Second, the prototypes of packets, which the packet processor may produce, are registered in the packet dictionary. The first function makes other components, such as the packet dispatcher, aware of the packet processor itself. The second function makes other components aware of the packets that the packet processor may produce.

Text Extraction Module. A text extraction module (TEM), such as text extraction module 206 of FIG. 2, is a generic, non-terminal packet processor. The purpose of the text extraction module is to identify and format user-specified text entities. In one embodiment related to the directed maintenance domain, examples of text entities include document references, part numbers, observations and faults. As with all packet processors, the TEM is passed a packet and a processor argument. The processor argument specifies which collection of text extraction rules should be applied to the input text. The input text comprises the values of the user specified packet content.

The TEM performs the following acts when processing a packet. First, the TEM identifies the entities specified by the text extraction rules. Second, the TEM formats the entities according to the text extraction formatting rules. Finally, the TEM outputs one or more packets for each entity it has identified and formatted.

The TEM identifies entities as follows. First, the TEM performs a lexical analysis on the input text in order to transform the input text into a list of tokens. Tokens are specified by one or more extended regular expressions or by a previously specified entity. The specification of tokens, however, does not need to be exhaustive. The user does not need to specify regular expressions for text that does not directly contribute to the identification of an entity. Hence, tokenization is performed in two steps. The TEM finds all of the tokens that the user specified and then creates default tokens by applying user specified filters to the text between user specified tokens. Once the input text has been tokenized, the TEM performs a second lexical analysis on the tokenized input text in order to identify entities. Entities are specified by one or more productions. Productions are extended regular expressions whose atomic unit is a token. In summary, the entity identification process is a two pass lexical analysis. The first pass converts the input text to a list of tokens via extended regular expressions of characters. The second pass identifies entities in the tokenized input text via extended regular expressions of tokens.

Figure 13:
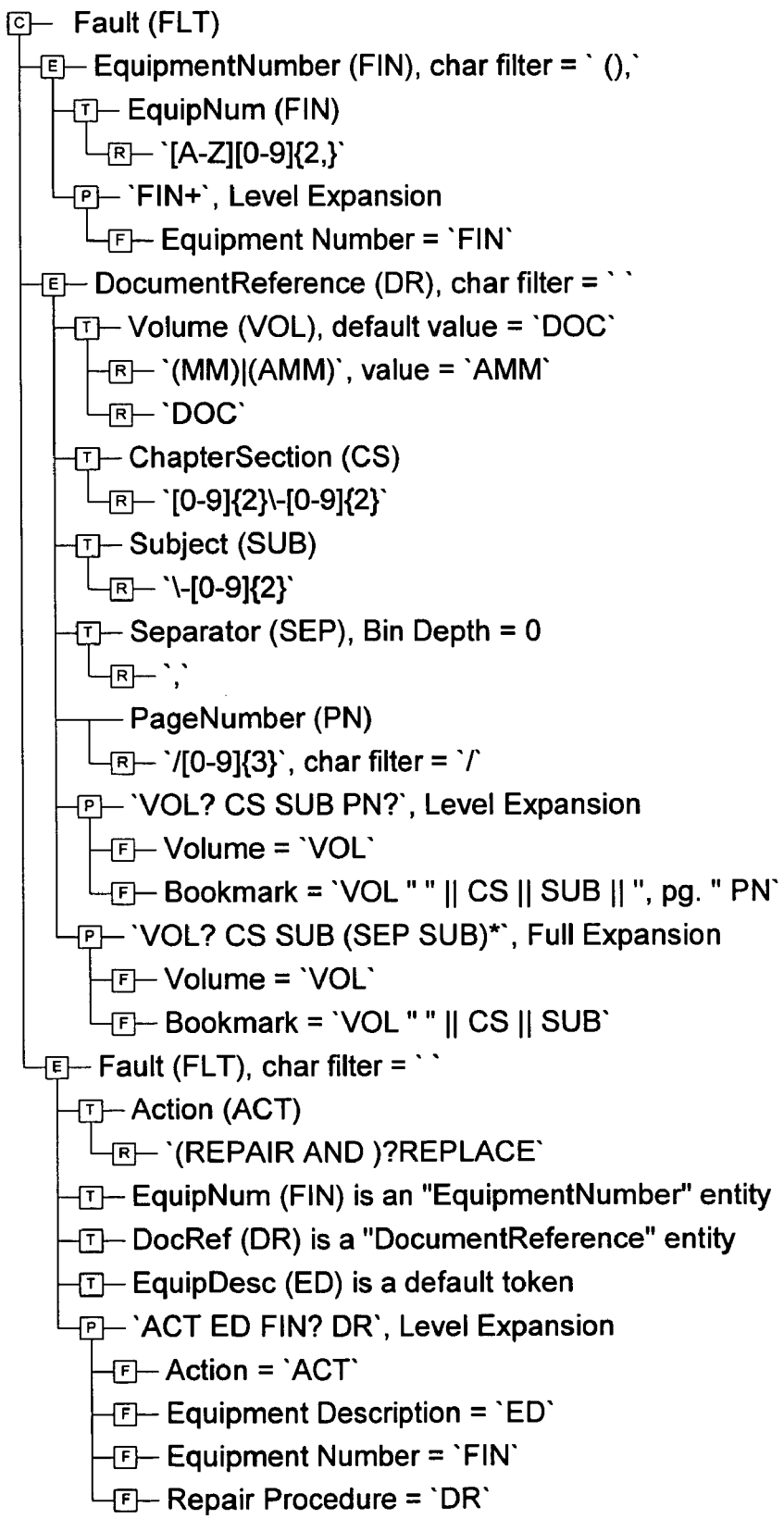
FIG. 13 is a hierarchical representation of a collection of text extraction module rules.

Consider the sample input text of FIG. 12 and the entities, tokens, and regular expressions of FIG. 13. FIG. 12 is sample input text that is to be processed by a text extraction module. FIG. 13 is a hierarchical representation of a collection of text extraction module rules. The boxed letters in FIG. 13 identify the item in the rule hierarchy. The letter 'C' indicates the item is a collection, 'E' an entity, 'T' a token, 'R' a regular expression, 'P' a production, and 'F' a format. For example, to identify EquipmentNumber entities in the sample text of FIG. 12, the TEM first finds the tokens defined in the EquipmentNumber entity. In this example, the EquipmentNumber entity only defines one token, an EquipNum with a single regular expression [A–Z][0–9]{2,} that matches a letter followed by two or more numbers. In the sample text of FIG. 12, the TEM identifies three EquipNum tokens: W121, W122 and W123. Next, the TEM filters the remaining text using the character filter specified on the EquipmentNumber entity item. In this example the character filter contains a space ' ', an open parenthesis '(', a closed parenthesis ')', and a comma ','. The filter is applied by removing the leading and lagging characters, which are in the filter, from the remaining blocks of text. After applying the filter, the remaining blocks of text become default tokens.

For example, in FIG. 12 consider the text between the EquipNum tokens W122 and W123, i.e., a comma and a space. Since both of these characters are in the filter, they are removed and consequently no default token is made between these EquipNum tokens. On the other hand, in FIG. 12 consider the text between the W123 EquipNum token and the end of the input text, i.e., ") (DOC 21-51-11,-22,-23).". The TEM first removes the leading characters that are in the filter. Since the first character is a closed parenthesis (a character that is in the filter) it is removed and the next character is examined. Since it is a space, it is also removed. This continues until the text extraction module encounters a character that is not in the filter. The first such character is the letter 'D'. The TEM then removes the lagging characters that are in the filter. Since the last character is a period, a character that is not in the filter, the character remains and the search terminates. If the last character was in the filter, the TEM would remove this character and examine the second to last character. This process would continue until the TEM encountered a character, which was not in the filter. Since the text "DOC 21-51-11,-22,-33)." remains after filtering the leading and lagging characters, it becomes a default token. Table 1 below provides a list of EquipNum tokens and default tokens resulting from the text extraction module performing a lexical analysis to identify Equipment-Number entities in the sample text.

TABLE 1

A list of tokens and their values.

| Token | Value |
| --- | --- |
| Default | IF THE PROBLEM CONTINUES, REPLACE THE L (R, C) WIDGET |
| FIN | W121 |
| FIN | W122 |
| FIN | W123 |
| Default | DOC 21-51-11, -22, -33). |

At this point, the sample input text is tokenized into five tokens: Default, FIN, FIN, FIN, and Default. Next, TEM performs a second lexical analysis to find the Equipment-Number entity's productions. In this example, there is only one production, FIN+, which matches one or more EquipNum tokens. (FIN is the abbreviation of EquipNum.) Consequentially, the text extraction module finds one entity, the three EquipNum tokens as shown in FIG. 14.

Once an entity is identified in the input text, it is formatted into one or more fields. The entity is then packaged as a packet and sent to the packet dispatcher. The TEM formats entities as follows. First, the TEM puts the matched production's tokens into bins according to their type. Second, the TEM performs a full or level expansion on the tokens in the bins. Third, the TEM creates a field for each of the matching production's formats. Finally, the TEM creates a packet and inserts the fields into the packet as content.

Again, let us consider the sample input text and the rules of the DocumentReference entity. Upon applying the two-level lexical analysis, the TEM identifies one ChapterSection token (CS), three Subject tokens (SUB), and two Separator tokens (SEP) as shown in FIG. 15. In addition, the TEM identifies one entity that matches the second production, VOL? CS SS (SEP SS)*, as shown in FIG. 15. The six tokens of the matched production are CS, SUB, SEP, SUB, SEP, and SUB. The TEM now puts the values of the listed tokens into bins according to their type. In one embodiment, prior to placing a value into a bin, the TEM first verifies that the bin has room.

Figures 14, 15, 16:
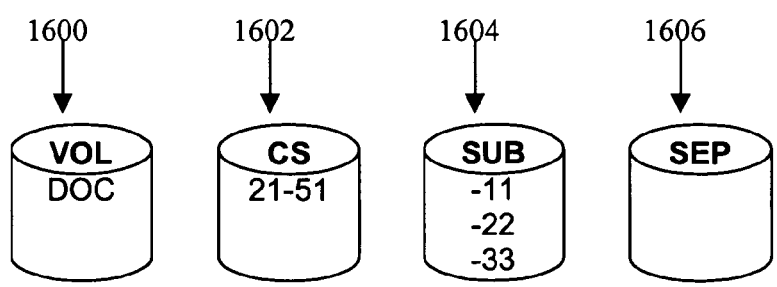
FIG. 14 is sample input text in which the text extraction module identified the EquipmentNumber entities as defined by the example text extraction rules of FIG. 13.
FIG. 15 is sample input text in which the text extraction module identified the DocumentReference entities as defined by the example text extraction rules of FIG. 13.
FIG. 16 shows the token values for the DocumentReference production (as defined by the example text extraction rules of FIG. 13) sorted into bins.

FIG. 16 shows the token values for the DocumentReference production (as defined by the example text extraction rules of FIG. 13) sorted into bins. For example, the value of a first token is "21-51" and its type is ChapterSection (CS). Since the CS token definition did not specify a bin depth, the depth is assumed to be infinite. Consequently, the value "21-51" is inserting into the CS bin 1602. The value of a second token is "-11" and its type is Subject (SUB). Since the Subject's bin depth is also infinite, the value "-11" is inserted into the SUB bin 1604. The value of a third token is "," and its type is Separator (SEP). Since the Separator's bin depth is zero, as indicated in FIG. 13, the TEM does not insert this token's value into the SEP bin 1606. To do so would cause the number of values in the bin to exceed its depth. After the TEM attempts to put all of the token values into bins, it then checks if any bin is empty. If a bin is empty and its corresponding token rule specifies a default value, the default value is inserted into the bin. In the current example, the Volume (VOL) and Separator (SEP) bins 1600,1606 are empty. Since the VOL token specifies the default value "DOC", "DOC" is inserted into the VOL bin 1600 as shown in FIG. 16.

After the token values of the match production are inserted into bins as shown in FIG. 16, the TEM performs a level or full expansion on the bin contents. FIG. 17 lists the sets of token values formed by performing a full expansion on the bins of FIG. 16. During a level expansion, the TEM groups the ith value of each bin into a set, where index i ranges from 1 to the maximum number of values in any bin. The previous statement only applies to bins that contain multiple values. For bins that contain a single value, the first value is grouped into each set. If the values of multi-valued bins with unequal number of values are expanded, then some sets will be missing values. During a full expansion, the TEM groups all combination of the values into sets. In the current example, the matched production rule specifies a full expansion. Consequently, the TEM forms the three groups as shown in FIG. 17.

After the token values of the matched production are grouped into sets, each set is formatted into one or more fields. FIG. 18 illustrates the field labels and values resulting from applying the matched production's Volume and Bookmark formats to the sets of values of FIG. 17. The number of the matched production's formats determines the number of fields. Formats contain a label and a format specification. In one embodiment, format specifications have the following syntax.

"prefix" TOK1 "suffix" || "prefix" TOK2 "suffix" || . . . . || "prefix" TOKn "suffix"

The information between the vertical lines is considered a token format group. Each group must specify a token by its abbreviation and may contain an optional prefix and suffix. This token is referred to as the format token. The prefix and suffix is text enclosed by quotes. The TEM applies the format to each set of the token values as follows. For each token format group, the TEM checks if the set contains a value of the format token. If it does, then the TEM appends the text of token format group's prefix, the format token's value, and the token format group's suffix to a field buffer. It should be noted that a format specification does not need to have a token format group for each token in the production. A finite state machine parses the format specifications into a form suitable for applying the algorithm outlined above. The finite states for this machine are listed in FIG. 17.

For example, consider the Bookmark format of the matched production, i.e., VOL" " || CS || SS, and the first set of values in FIG. 17. The first token format group contains the VOL format token and suffix. Since the set contains a value of the VOL format token, the value "DOC" and the suffix " " is appended to the field buffer. The remaining two token format groups contain the tokens CS and SUB. These groups do not contain prefixes or suffixes. Since the set contains values of both the CS and SUB format tokens, the values "21-51" and "-11" are appended to the field buffer. After applying the format, the field buffer contains the text "DOC 21-51-11". Applying the matched production's Volume and Bookmark formats to the sets of values in FIG. 17 results in three sets of fields as shown by FIG. 18.

Finally, after the TEM creates sets of formatted fields (as shown in FIG. 18), it creates a packet for each set of fields as follows. First, the TEM concatenates the text "Tem", entity's name and the text "Entity" to forms the packet type. Second, the TEM adds a content label-value pair whose label is "EntityId" and whose value is a unique identifier for packets of this type. Third, the TEM adds a content label-value pair for each formatted field. The content's label is the field's label and the content's value is the field's value. Fourth, the TEM clones the context label-value pairs from of the input packet, whose content was the input text, to the entity's packet. Finally, the TEM adds four additional context label-value pairs. These contexts are labeled "TemParentPacketType", "TemParentContentLabel", "TemCollectionName" and "TemEntityName". The values of the "TemParentPacketType" and "TemParentContentLabel" context are the packet type and content label of the packet whose content was the input text.

Figure 19:
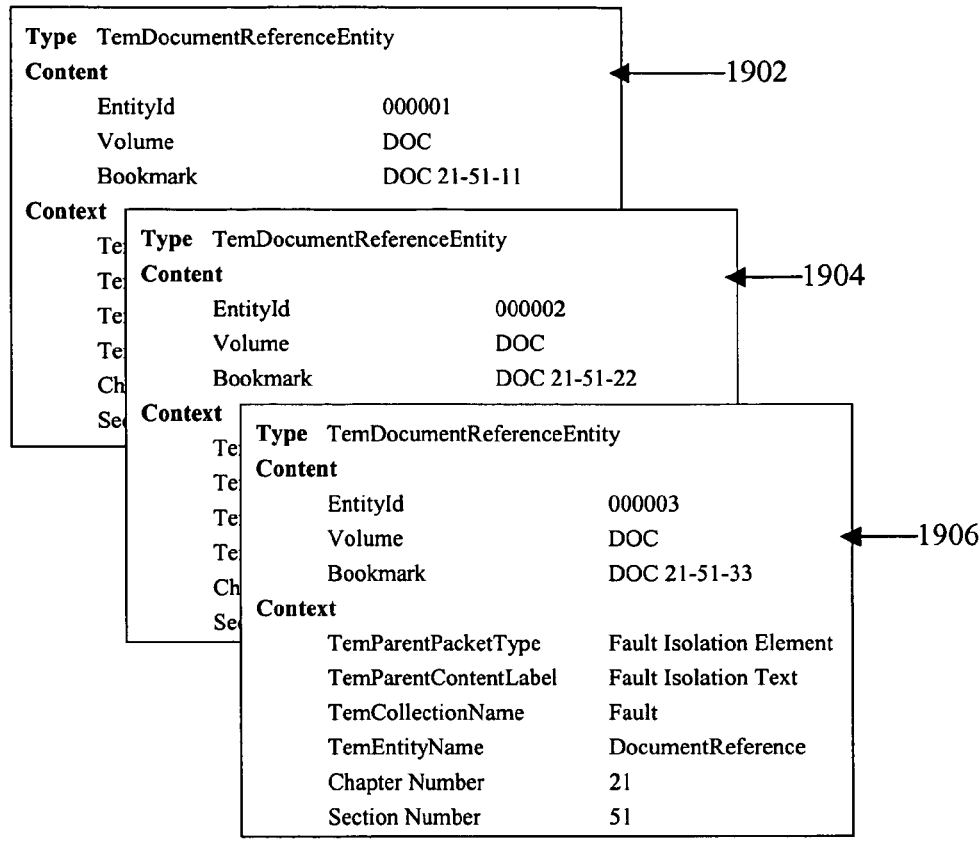
FIG. 19 illustrates example embodiments of packets that are created from the field labels and values of FIG. 18.

The values of the "TemCollectionName" and "TemEntityName" context are the name of the collection and entity whose rules were used to identify and format the entity. The packets 1902, 1904, 1906 that correspond to the Document Reference entity in the sample text are shown in FIG. 19. FIG. 19 illustrates example packets that are created from the field labels and values of FIG. 18. In the example embodiment in FIG. 18, it is assumed that the sample text came from the "Fault Isolation Text" content of a "Fault Isolation Element" packet. It is also assumed that the "Fault Isolation Element" packet had "Chapter Number" and "Section Number" context.

Figure 20:
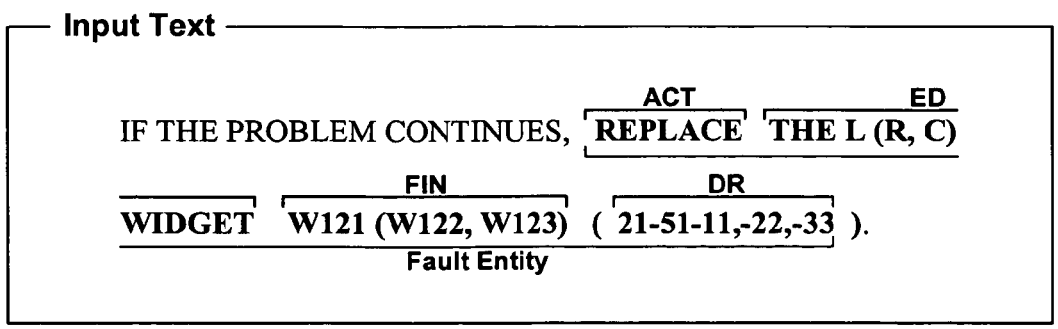
FIG. 20 is sample input text in which the text extraction module identified the Fault entities as defined by the example text extraction rules of FIG. 13.

When processing input text, the TEM searches for the entities of the collection specified by the processing argument. In one embodiment, the entities are searched in the order in which they are specified within the collection. In the current example, the TEM first identifies EquipmentNumber entities, then DocumentReference entities, and finally Fault entities as indicated in FIG. 13. In the EquipmentNumber of DocumentReference entities, all of the tokens were specified by one or more regular expressions. However, this is not true of the Fault entity as indicated in FIG. 13. Of its four tokens, one of these tokens, the Action token, is similar to the EquipmentNumber and DocumentReference tokens in that it is specified by a regular expression. The remaining tokens, however, are different. The EquipNum and DocRef tokens are specified by the EquipmentNumber and DocumentReference entities respectively; while, the EquipDesc token is a default token. The EquipNum and DocRef tokens will match previously identified EquipmentNumber and DocumentReference entities. In the current example, the EquipNum token matches the text "W121 (W122, W123)" while the DocRef token matches the text "21-51-11,-22,-33". The EquipDesc matches the filtered text between the Action and EquipNum tokens, i.e., "THE L (R, C) WIDGET" as shown in FIG. 20. FIG. 20 is sample input text in which the text extraction module identified the Fault entities defined by the example text extraction rules of FIG. 13. Note that the value of the EquipDesc token is the text of what would be a default token if the Fault entity did not specify the EquipDesc token. To avoid ambiguity, an entity may only specify one of its tokens as a default token.

Figure 21:
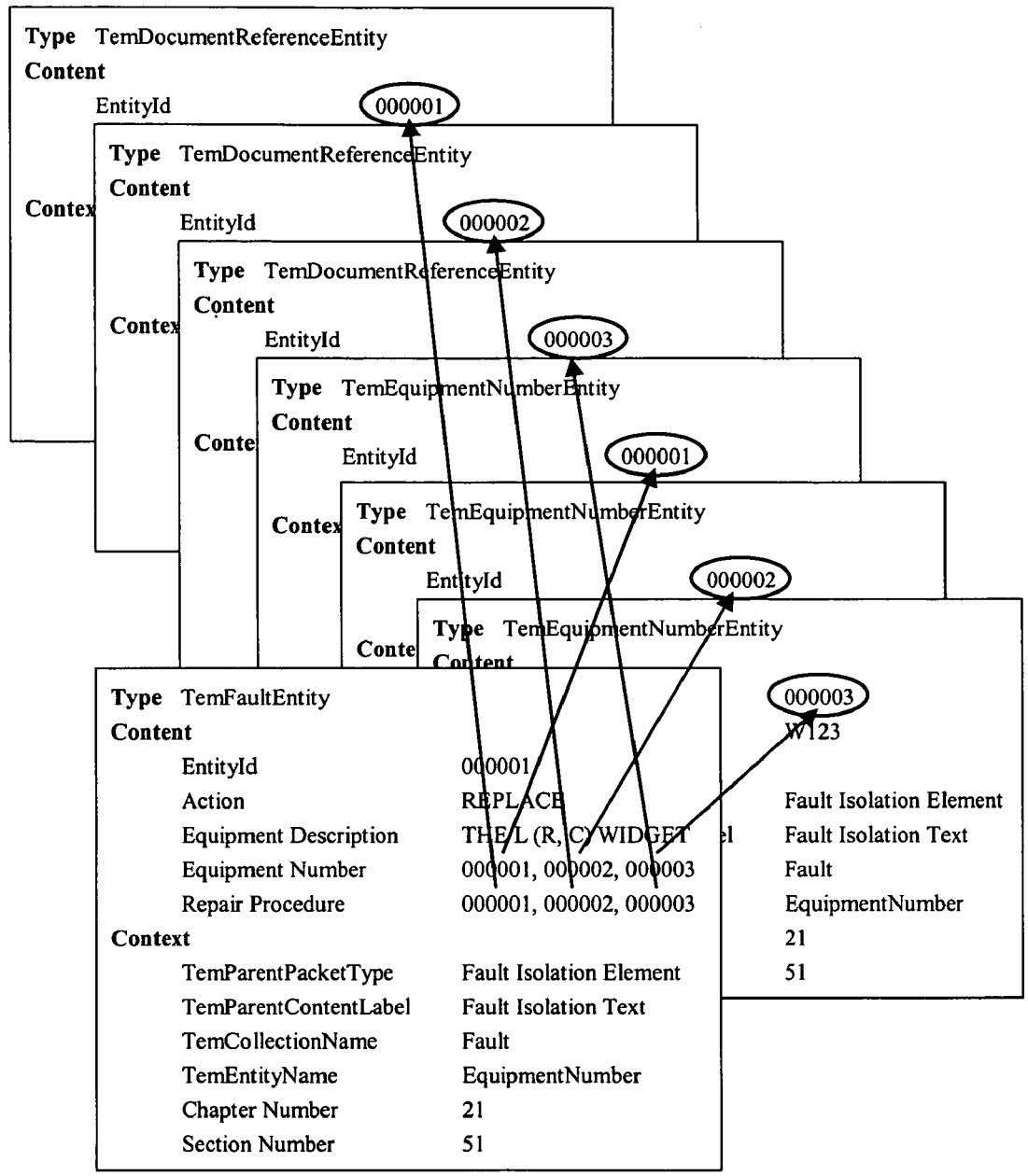
FIG. 21 illustrates the relationships between the TemFaultEntity packet and the TemDocumentReferenceEntity and the TemEquipmentNumberEntity packets.

As with the case of the EquipmentNumber and DocumentReference entities, the TEM creates a TemFaultEntity packet for the Fault entity as shown in FIG. 21.

Since the matching production specifies four format items, the TemFaultEntity contains Action, Equipment Description, Equipment Number, and Repair Procedure content in additional to the generic EntityId content, which is present in every packet that the TEM creates. As expected, the values of the Action and Equipment Description content are "REPLACE" and "THE L (R, C) WIDGET" respectively. However, the values of the Equipment Number and Repair Procedure content is not "W121 (W122, W123)" and "21-51-11,-22,-33". Instead, both the Equipment Number and Repair Procedure content has three values, that correspond to the values of the EntityId content of previously created TemEquipmentNumberEntity and TemDocumentReferenceEntity packets. Hence, the values of tokens that are specified by previously defined entities are the values of the EntityId content of the corresponding packets. This feature provides a method to link packed, created by TEM, to each other. For example, FIG. 21 illustrates the relationships between the TemFaultEntity packet and the TemDocumentReferenceEntity and the TemEquipmentNumberEntity packets. Note that both the Equipment Number and Repair Procedure content of the TemFaultEntity packet have three values, although they are illustrated as a comma separated list.

Packet Export Module. The packet export module (PEM) is a generic, terminal packet processor. In other words, this module does not generate any children packets nor is it specific to a particular knowledge repository schema. The purpose of the packet export module is to export packets to knowledge repositories, which are open database connectivity (ODBC) compliant. The import filter and the PEM share many of the same attributes. The import filter is trainable, requires the structure of the data source to be imported prior to training, and shelters the packet processing modules from the intricacies of the data source. Likewise, the PEM is trainable, requires the structure (schema) of the knowledge repository to be imported prior to training, and shelters the packet processing modules from the intricacies of the knowledge repository.

The PEM behavior is governed by packet export rules, which map packet content and context to fields of database tables. Just as the structure of the input data must be outlined and imported into the import filter rules repository prior to training the packet construction rules, the schema of the knowledge repository must be analyzed and imported into the packet export rules repository prior to training the packet export rules.

Figure 22:
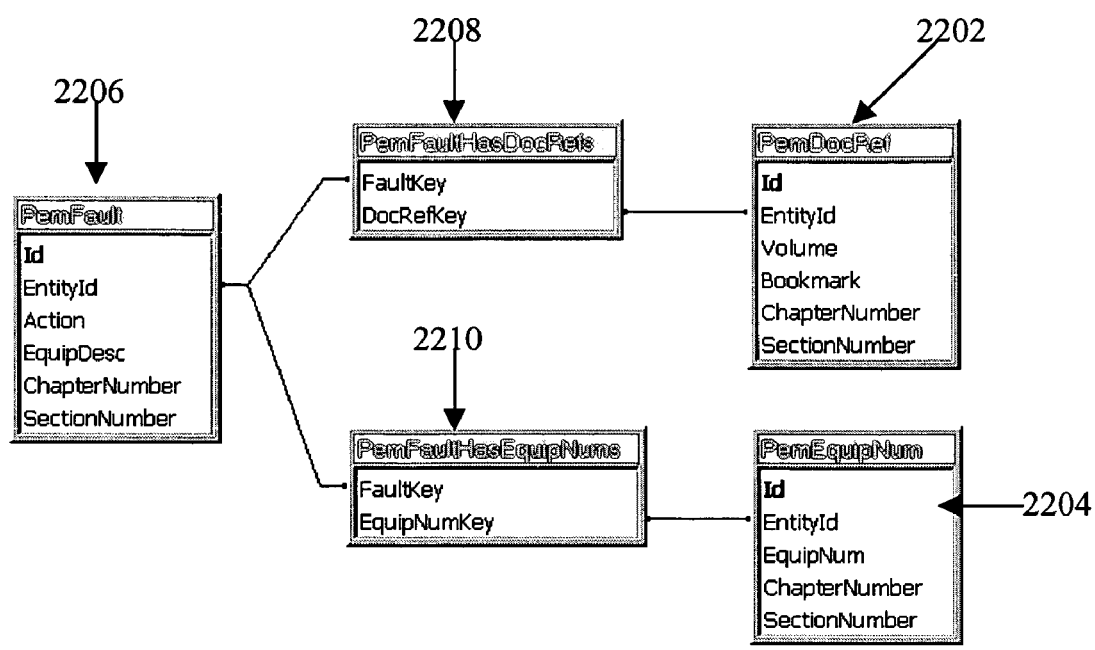
FIG. 22 is a block diagram illustrating a database schema of a sample knowledge base to which packets are exported.

For example, consider a sample knowledge repository whose database schema is depicted in FIG. 22. FIG. 22 is a block diagram illustrating a database schema of a sample knowledge base to which packets are exported. The sample knowledge repository shown in FIG. 22 consists of five tables. The PemDocRef 2202, PemEquipNum 2204 and PemFault 2206 tables store the information in TemDocumentReferenceEntity, TemEquipmentNumberEntity and TemFaultEntity packets respectively. The PemFaultHasDocRefs 2208 and PemFaultHasEquipNums 2210 are many-to-many relationship tables, which store the relationship information in TemFaultEntity packets. After the database schema of the knowledge repository is imported into the packet export rules, the user may specify packet export rules. If the database schema of the knowledge base is modified, then subsequently re-imported, the PEM tags the differences between the previous and current schema. The import is performed in such a manner that existing packet export rules are preserved.

Figure 23:
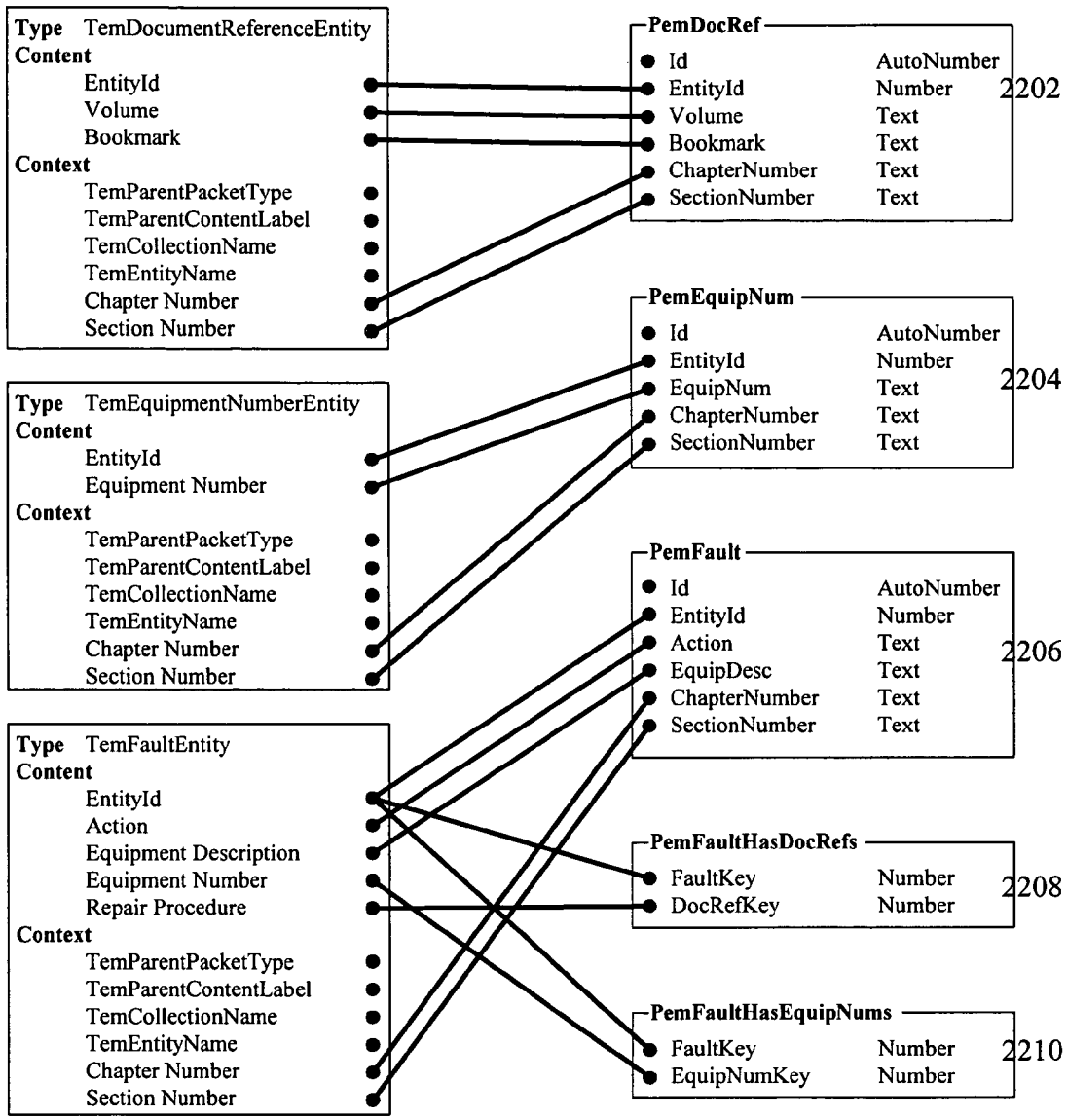
FIG. 23 is a graphical representation of the packet export rules which map example entities to example tables.

FIG. 23 is a sample mapping between the packets shown in FIG. 21 and database tables is shown in FIG. 22. Since the packet content may have multiple values, while a field of a database table may store at most one value, an expansion must be performed upon the packet values in order to group these values into sets that are exported to the knowledge base. These expansion methods are similar to the expansion methods used by the text extraction module to group values in the token bins into sets.

Consider the values of all of the packet content and context that is mapped to one database table. For a level expansion, PEM groups the ith value from each multi-valued packet content as well as the value of each single-valued content and all context into sets and exports these values to the knowledge repository. For a full expansion, PEM groups every combination of packet content and context values into sets and exports these values to the knowledge repository.

Notice the packet content and context that have a circle with the letter 'R' next to them in the sample packet export rules. This icon indicates that it is required for these content and context to have values in order to export any of their values. In other words, if any of the required content and context, which is mapped to a single database table, does not contain at least one value, then PEM will not export any sets of values to that database table. Now consider what PEM does when non-required content or context, which does not contain any values, is exported to a field of a database table. If the field is nullable, i.e., it can store null, then PEM exports null. If the field is not nullable, then PEM exports 0 if the field stores numeric data or a zero-length string if the field stores text. If the field is not nullable and cannot store a zero length string, then PEM issues a packet export error message.

As an example, consider how PEM would export the packets of FIG. 21 to the knowledge repository, whose schema is shown in FIG. 22, using the packet export rules shown in FIG. 23. First, consider the TemDocumentReferenceEntity packets. The packet's EntityId, Volume and Bookmark content is mapped to the EntityId, Volume and Bookmark fields of the PemDocRef table; while, the packet's Chapter Number and Section Number context is mapped to the ChapterNumber and SectionNumber fields of the PemDocRef table. The packet export rules also state that (i) the values in the packet will be level expanded into sets and exported as database records, and (ii) only sets that contain values for each mapped packet content and context will be exported. (The second observation is a consequence of each packet content and context being required.) Since all of the content of the TemDocumentReferenceEntity packets of FIG. 21 is single-valued, the level expansion is trivial. Each packet generates a single set of values that are exported as records to the PemDocRef table as shown in FIG. 24. Note: The values of the Id field are automatically generated since this field is of type AutoNumber.

Now consider the remaining packets of FIG. 21. Since TemEquipmentNumberEntity and TemDocumentReferenceEntity packets are exported to the knowledge repository in the same manner, let us focus on TemFaultEntity packets. According to the packet export rules, TemFaultEntity packets are mapped to the three tables: PemFault, PemFaultHasDocRefs and PemFaultHasEquipNums. The TemFaultEntity to PemFault mapping is similar to the TemDocumentReference to PemDocRef mapping with one exception. TemFaultEntity's Equipment Description content is not required; hence, PEM will export a set of values to the knowledge repository as a TemFault record even if the packet does not contain an Equipment Description value. In other words, if the TemFault packet has Equipment Description content, its value will be exported along with the other values. However, if the TemFault packet does not have Equipment Description content the other values will be exported and the Equipment Description field will either be null or an zero length string.

Finally, consider TemFaultEntity to PemFaultHasDocRefs mapping. The packet's EntityId and Repair Procedure content is mapped to the FaultKey and DocRefKey fields of the PemFaultHasDocRefs table respectively. The value(s) of the EntityId and Repair Procedure content of the TemFaultEntity packet of FIG. 21 are 1 and 1, 2 and 3 respectively. (The EntityId content has one value and the Repair Procedure content has three values.) The packet export rules specify that these values should be fully expanded in order to create sets that are exported as records to the PemFaultHasDocRefs table, three sets of values are created and exported as shown in FIG. 25.

In summary, when exporting the packets of FIG. 21 to the knowledge repository using the packet export rules shown in FIG. 23, PEM creates the following database records.

Three PemDocRef records, one from each TemDocumentReference packet

Three PemEquipNum records, one from each TemEquipmentNumberEntity packet

One PemFault record, three PemFaultHasDocRefs, and three PemFaultHasEquipNums packets from the TemFaultEntity packet CGM Processing Modules. In addition to purely textual data, the D2K tool also can process graphical files in Computer Graphics Metafile (CGM) format. A CGM file is a collection of graphical elements with each element containing an opcode identifying it as well as some data that defines it. In one embodiment, CGM processing in D2K is accomplished through a three-tier process. At the base, a CGM parser module loads the CGM graphic file and fires callbacks whenever it identifies a new graphical element. At this lowest level, the parser does not do any processing of the data; it only enumerates a file's graphical content. At the middle tier, a software module uses the bottom level to enumerate content, but this time it retains all the textual elements and box forming line segments. Once all those entries have been stored, the module attempts to associate the text with their bounding rectangles. This middle tier provides an interface that allows the upper level to enumerate these boxes as well as the text that they contain. The topmost tier creates D2K packets from CGM drawings called fault isolation diagrams. A fault isolation diagram is a graphical if/then drawing with the conclusions or actions to be taken listed in boxes on the right side of the page. This topmost tier uses the middle tier to process the document. It then enumerates the boxes in the rightmost column and creates packets containing the text in those boxes. Those packets are then processed by D2K as if they originated from an import filter.

Figure 26:
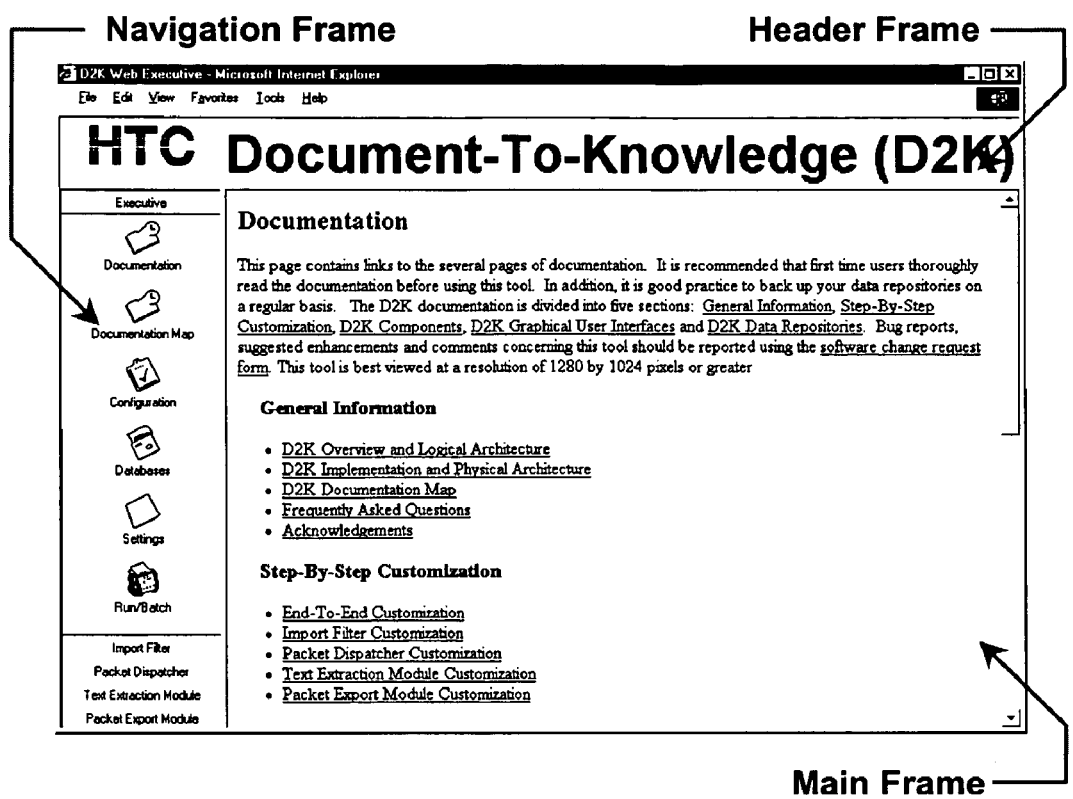
FIG. 26 is an example embodiment of a user interface for the Web Executive.

Web Executive. FIG. 26 is an example embodiment of a user interface for the Web Executive. As shown in FIG. 26, a header frame displays the application's logos. A navigation frame contains groups of buttons, which when pressed update the main frame with a corresponding web page. The web pages in the main frame, and the controls that are hosted on them, display instructions, provide a mechanism by which the user can interact with D2K, and manage global functions such as error reporting, option setting and configuration loading/saving.

In one embodiment, the navigation frame comprises five groups of buttons: Executive, Import Filter, Packet Dispatcher, Text Extraction Module and Packet Export Module. The buttons in the Executive group load web pages that allow the user to browse documentation, load and save configurations, specify databases and settings, and run the tool. The buttons in the remaining groups load web pages that allow the user to train the import filter, packet dispatcher, text extraction module and packet export module.

In one embodiment, the components hosted on the web pages run on a client side. The D2K components, however, can be modified to run on a server side so that the client simply receives and displays an HTML stream. This allows a user to interact with D2K from any machine capable of running a web browser.

User Interfaces. The following sections describe the D2K user interfaces. First, the import filter user interface is discussed. This discussion is followed by discussions on the packet dispatcher user interface, the text extraction user interface, and, finally, the packet export user interface.

Import Filter User Interface. In one embodiment, users train the Import Filter via the import filter user interface. The user interface allows the user to create, modify and delete packet construction rules for hierarchical structured data sources such as SGML documents. A benefit of the import user interface is that it allows the user to visualize the hierarchical structure of a data source. The user interface consists of a main editor window and a modeless window, which displays the packet of the selected packet. Each of these windows will be discuss in further detail.

Figure 27:
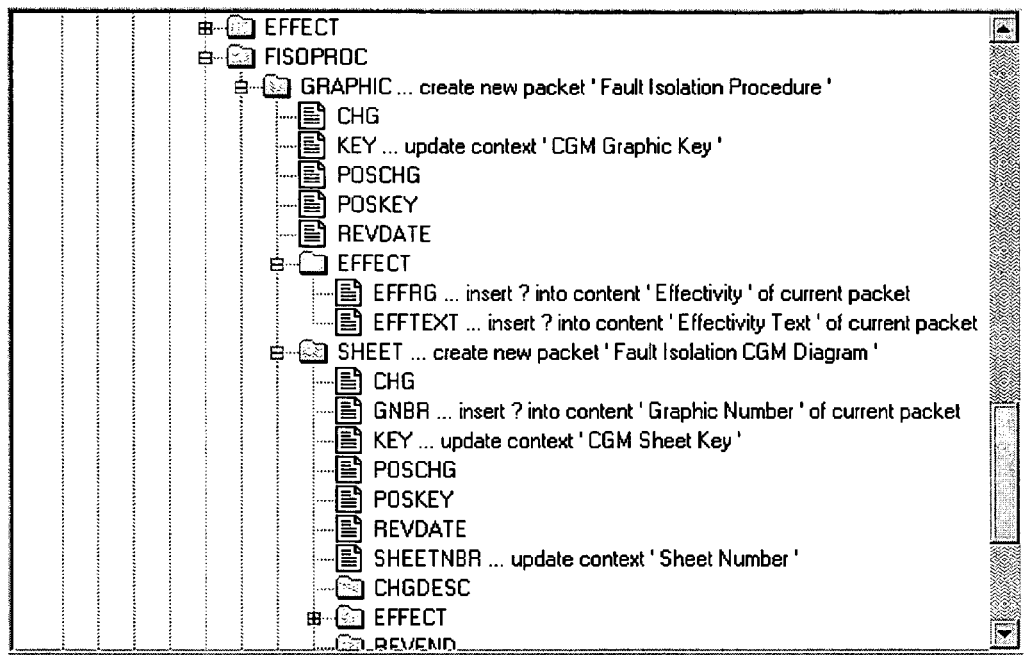
FIG. 27 is a screen capture of one embodiment of an import filter editor.

FIG. 27 is a screen capture of one embodiment of an import filter editor. The import filter editor displays hierarchical structured data as a tree as shown in FIG. 27. The elements of the data source are displayed as folders; while, the attributes are displayed as documents. For example, the user right clicks on a node (or otherwise selects a node) to alter its actions. Element and attribute names are displayed next to the icons. An ellipsis ( . . . ) and a packet construction rule follow the names. In order to avoid clutter, if the packet construction rule is to "ignore the data", then it is not shown.

Figure 28:
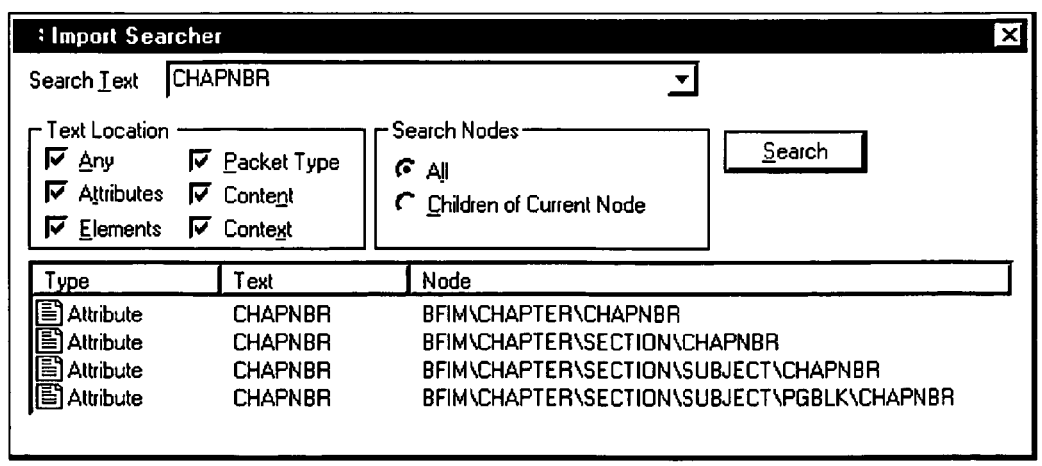
FIG. 28 is one embodiment of an import filter editor's search dialog box.

Users can search the tree for text by invoking the search dialog box, which is shown in FIG. 28. To do so, users right click in the editor and select the "Search . . . " command from the pop-up menu.

The "Text Location" controls allows users to specify whether they are interested in limiting their search to attributes, elements, packet types, content, or context. User can search all of the aforementioned items as well. In addition, user can either search all nodes of the tree or just the children of the current node via the "Search Nodes" controls. After entering the desired search parameters, users presses the "Search" button to perform the search. The search results are then displayed in the list view. User may double click on an element in the list to select it in the import filter editor, i.e., the main window. The search window can be resized and moved; the dialog's size and location persist between uses.

Figure 29:
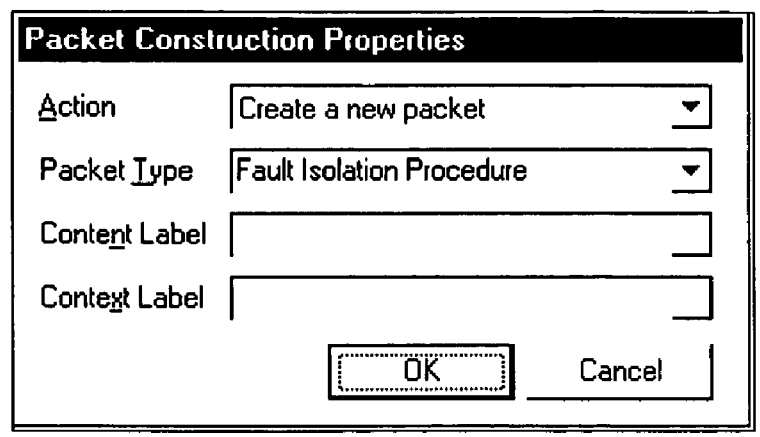
FIG. 29 is one embodiment of an import filter editor's packet construction properties dialog box.
Figure 30:
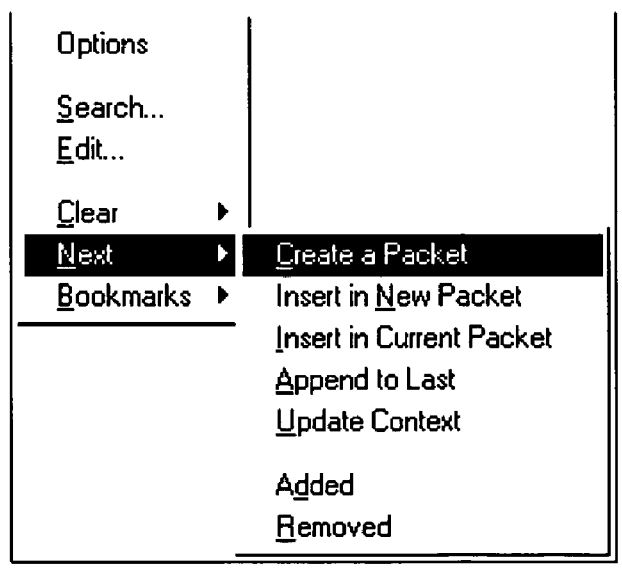
FIG. 30 is one embodiment of an import filter editor's "Next" menu.

In addition to searching for text, users may invoke other commands from the pop-up menu, as shown in FIG. 30, such as clear, edit, next and bookmark. Users can clear all the actions of the currently selected node and its descendents by selecting the 'Clear' command. This command resets the actions of all of the affected nodes to "Ignore". Users can edit the rule of the currently selected node by selecting the "Edit" command. The "Edit" command invokes the "Packet Construction Properties" dialog box, which is shown in FIG. 29. FIG. 29 is one embodiment of an import filter editor's packet construction properties dialog box. This dialog box can also be invoked by double clicking on a node.

Users may edit the rule's action, and, depending upon the rule, its associated packet type, content label and context label. Packet content and context is kept consistent with the packet type and can be selected by choosing items from the drop down combo boxes. To create a new packet type, content label or context labels, users can simply type a new name in the appropriate combo box.

In addition to the traditional methods of navigating a tree view, the user may select the 'Next' menu, which is shown in FIG. 30. FIG. 30 is one embodiment of an import filter editor's "Next" menu. The commands in the "Next" menu, allow the user to select the next node that has the specified action, or the next node that has the specified difference flag. For instance, by selecting the Next | Create a Packet command, users can quickly locate the next node whose rule creates a packet.

Figure 31:
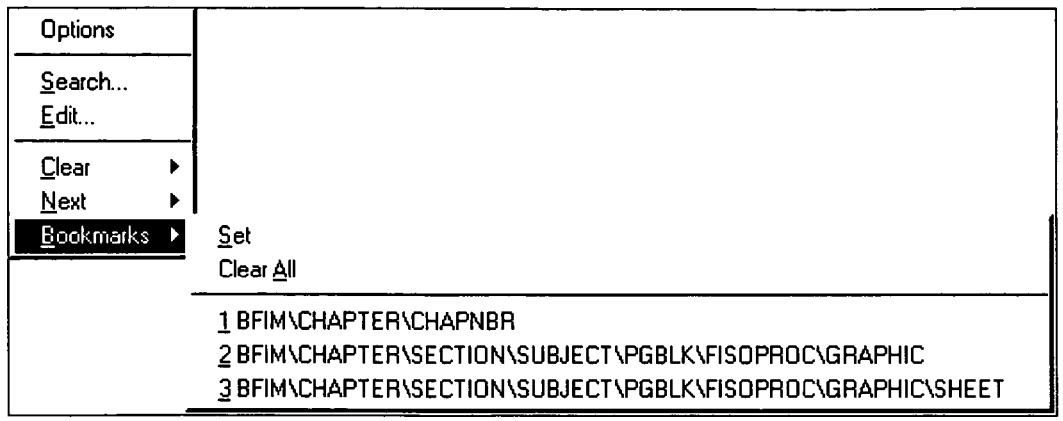
FIG. 31 is one embodiment, of an import filter editor's "Bookmarks" menu.

Finally, users can bookmark nodes in the treeview, allowing them to quickly navigate between significant nodes. If the currently selected node has not been bookmarked, users can select the 'Set' command on the Bookmark submenu, which is shown in FIG. 31. FIG. 31 is one embodiment of an import filter editor's "Bookmarks" menu. If the currently selected node has been previously bookmarked, users can clear the mark by selecting the 'Clear' command. To remove all bookmarks, users can select the 'Clear All' command. Bookmarks are retained between editing sessions. Thus, users may want to occasionally clear bookmarks that are no longer needed, especially when creating packet construction rules for a different data source. If the user has bookmarked more than 9 nodes, only the first 9 will be numbered.

Figure 32:
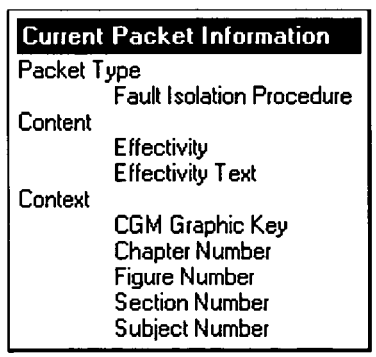
FIG. 32 is one embodiment of a modeless "Current Packet Information" window of the import filter user interface.

The modeless window, titled "Current Packet Information", displays the packet prototype of the currently selected mode. FIG. 32 is one embodiment of a modeless "Current Packet Information" window of the import filter user interface. This window allows the user to visualize the structure of the packet, which the import filter will generate by applying the currently selected packet construction rule and its applicable neighboring rules. This modeless window may be resized and positioned anywhere on the desktop.

The import filter editor also provides an additional method of visualizing the structure of packets. By hovering the mouse cursor over any node in the treeview, a pop-up hint window will temporarily appear. The contents of this hint window display the structure of the packet, which the import filter will create, in part, by applying the rule associated with the node that is selected by the mouse cursor.

Packet Dispatcher User Interface. The user may train the packet dispatcher via the packet dispatcher user interface. The interface is divided into two panels with a resizable splitter bar between them. Each of the panels is discussed in more detailed.

FIG. 33 is one embodiment a processor and packet selection panel of a packet dispatcher user interface. The processor and packet selection panel is implemented as a tree view, which is shown in FIG. 33. This panel contains all the registered processing modules. By hovering the mouse over a particular processor, the user can see all the packets (and their corresponding packet processing arguments) that are mapped to the it. Correspondingly, the tree view contains all the registered packet types as well as their legal context labels. By hovering the mouse over a particular packet type, the user can see all the processors to which the packet is mapped. To create a new match specification (matchspec), users may drag and drop a packet type onto a processor. This action will insert a new matchspec in the match specification panel, which is discussed next.

FIG. 34 is one embodiment of a match specification panel of a packet dispatcher user interface. The match specification panel is implemented as a list view, which is shown in FIG. 34. The list view shows all the match specifications (matchspecs), i.e., the packet dispatch rules that map packets to packet processing modules. Users can sort the matchspecs according to packet type, processor, argument or context by clicking on the corresponding column heading. Clicking the same column a second time sorts the column in the opposite direction. The user can change the format of the list view by right clicking and selecting 'View'.

To create a matchspec, users may drag a processor, a packet type or a packet context from the processor and packet selection panel onto an empty row in the match specification panel. This action will create a new matchspec, which contains the dropped item. If, on the other hand, a user drags an item from the processor and packet selection panel onto a matchspec in the match specification panel, the matchspec will be modified by incorporating the dropped item. The user can also right or double click an element to bring up the mapping properties dialog box.

Users may edit matchspecs by invoking the "Match Specification Properties" dialog box, which is shown in FIG. 35, by double clicking them. Alternatively, users may right click on matchspecs to invoke the pop-menu and selection the "Properties . . . " command. Via the "Match Specification Properties" dialog box, users may set the matchspec's processor, argument, and packet type. Additionally, users may use the 'Add . . . ' and 'Delete' buttons to insert packet context value pairs into the match specification. If a user changes the packet type of a matchspec, which has context value pairs, the editor will remove any invalid pairs, i.e., pairs that are not valid for the new packet type.

Finally, users may delete a matchspec by right clicking it in the match specification panel, and selecting the "Delete" command from the pop-up menu. Alternatively, users may simply select the matchspec and press the delete key.

Text Extraction User Interface. Users may train the Text Extraction Module (TEM) via the text extraction user interface. The user interface allows the user to create, modify and delete text extraction rules, e.g., collections, entities, tokens, regular expressions, productions and formats. One benefit of the text extraction user interface is that it allows users to immediately "see" the impact of any rule they create, modify or delete in real-time. The user interface consists of a dialog bar, rules panel, an annotation panel and a grid panel. Each of these components will be discuss in further detail.

The text extraction user interface dialog bar, which is shown in FIG. 36, resides at the top of the user interface control and contains ten buttons that allow the user to perform the following functions:

navigate through the "pages" of packet content,
switch from file mode to packet mode,
reload the rules from the text extraction module rules database,
save the changes that are done during the current session,
switch from packet mode to file mode, and
invoke the help.

The first four buttons, the arrow buttons, allow the user to go to the first, previous, next and last "page" of packet content. The packet content is read from a packet database. (The packet database is populated by running the tool with the "Save Packet in Database" processing option selected.) The "pages" are displayed in the annotation pane and annotated by displaying identified tokens and productions of the entity that is currently selected in the rules pane. The fifth button, Reload Packets, switches the annotation pane from file mode to packet mode, i.e., the text in the annotation pane is read from the packets database. The sixth button, ReloadDB, reloads the text extraction rules from the text extraction rules repository. The user will be warned that current changes will be discarded. The seventh button, SaveDB, commits changes to the text extraction rules and writes them to the text extraction rules repository. The eighth button, OpenFile, switches the annotation pane from packet mode to file mode, i.e., the text in the annotation pane is read from a user-selected file. The ninth button, About, displays relevant information about the text extraction user interface.

Finally, the tenth button, Help, launches the text extraction user interface help application.

Figure 37:
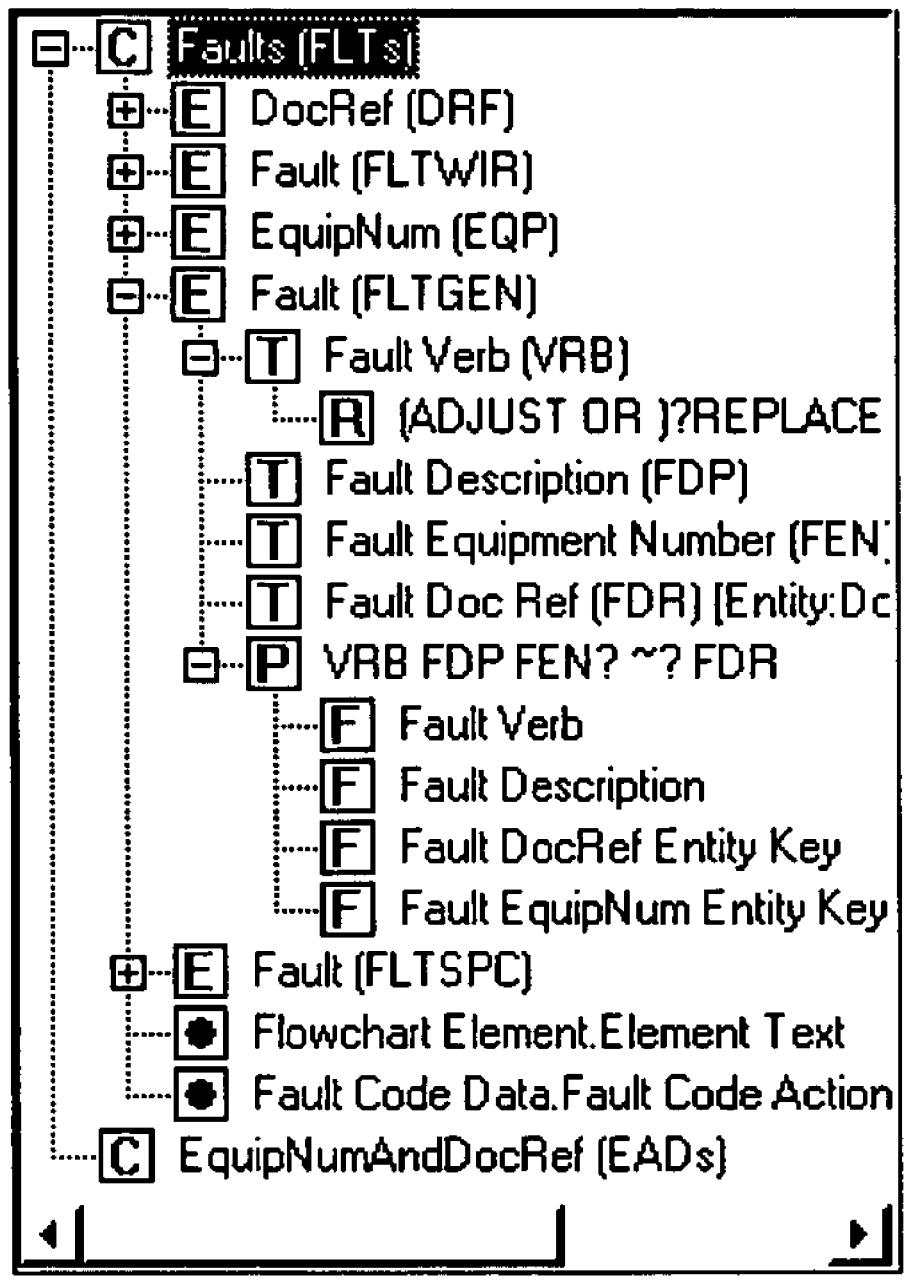
FIG. 37 is a screen capture of one embodiment of a rules panel.

The rules panel displays the text extraction rules in a hierarchical tree view as shown in FIG. 37. The tree nodes may either be collections, entities, tokens, regular expressions, productions, or formats. The icon, which represents one of these nodes, is a black capital letter enclosed in a box. The letter corresponds to the first letter of the node type, e.g., C for collections, E for entities, etc. In addition, nodes that specify which collections process which packet content are also present in the tree. A black circle enclosed by a box represents these nodes.

The text of the nodes depends upon its type. The text for collection nodes is the collection's name followed by its abbreviation in parentheses. The text for entity nodes is the entity's name followed by its abbreviation in parenthesis. Likewise, the text for token nodes is the token's name followed by its abbreviation in parenthesis. However, if the token refers to a previously identified entity, the text "Entity:" followed by the referenced entity's name and abbreviation is enclosed by brackets and appended to the token text. The text of regular expression nodes is the regular expression itself, while, the text of production nodes is the production's grammar. The text of format nodes is the name of the format's label. Finally, the text of "collection processes packet content" nodes is the packet type and the content label, separated by a period.

The user can perform several operations in the rules panel such as creating rules, deleting rules, copying rules, or moving rules. User can copy or move rules by dragging their node and dropping it on another node. If the user drags a node from one collection and drops it in a different collection, the node and its lineage are copied. If the user drags a node from one collection and drops it in the same collection, albeit, a different location, the user is prompted, via a pop-up dialog, as to whether he/she wishes to copy or move the node and its children. If the user right clicks in the rules panel while the mouse is not over a node, then a pop-up menu appears that allows the user to create a collection. However, if the user right clicks while the mouse is over a node, then a pop-up menu appears that allows the user to either delete the "selected" node or create a child node. For instance, if the user right clicks when the mouse is over an entity, then a pop-up menu appears that allows the user to either delete the entity, create a token or create a production. If the user right clicks when the mouse is over a regular expression node, then a pop-up menu appears that allows the user to only delete the regular expression.

Figure 38:
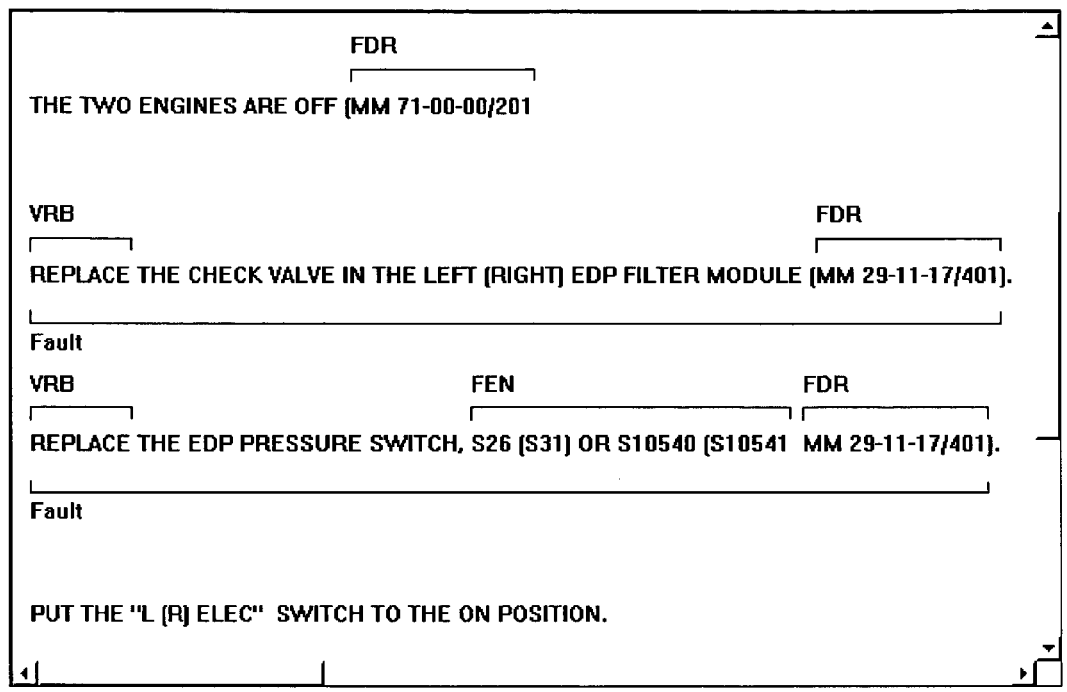
FIG. 38 is a screen capture of one embodiment of an annotation panel.

The annotation panel is a scrollable view as shown in FIG. 38, which annotates sample text by identifying the tokens and production of the current entity. If the currently selected item in the rules view is an entity, then current entity is the selected item. If the currently selected item in the rules view is not an entity, then the current entity is the entity whose ancestor is in the selected item. The sample text may either be read from a text file or loaded from the data in the packet repository.

If the sample text contains many lines, then the annotation pane displays the annotated text in different pages. Users may navigate through the pages via buttons on the dialog barDialog Bar.

For each line of sample text, the tokens and productions of the current entity are annotated. Tokens and productions are identified via horizontal brackets over and under the text respectively. Tokens are further annotated by displaying their abbreviated names on top of the brackets. If the abbreviation cannot fit over the token, an asterisk is displayed instead. By hovering the mouse over an asterisk, users will invoke a hint window that displays the abbreviation. In a similar fashion, productions are further annotated by displaying the selected entity name beneath the bracket. By hovering the mouse over the entity name, users will invoke a hint that displays the production's format labels and values.

Users can create, modify and delete rules via the grid panel. The grid panel contains multiple rows and columns as shown in FIG. 39. The first row of the grid displays the contents of the node, which is currently selected in the rules view. The middle rows of the grid display the contents of nodes, which are siblings of the currently selected node. The last row of the grid, which is marked with an asterisk is empty and allows the user create new rules. The number of columns, as well as the column headers, depends upon the type of currently selected node.

To create a new rule, users must enter the appropriate information into each column of the last row and navigate the cursor to a different row. Users can edit the contents of any column on the grid. The row, which is currently being edited, is marked with a symbol. To commit changes to a row, users must navigate the cursor to a different row via the mouse or the arrow keys. To delete a rule, users must select the row by clicking on the left most (non-editable) column and press the delete key. Upon user confirmation, the row (and the corresponding rule) will be deleted.

Packet Export User Interface. Users may train the Packet Export Module (PEM) via the packet export user interface. The user interface allows the user to create, modify and delete packet export rules, e.g., mappings between packet content/context to database table fields. One benefit of the packet export user interface is that it allows users to visualize the packet export rules in a meaningful fashion. The user interface consists of two panels, a selection panel and a graphics panel, as well as a status bar. Each of the panels will be discuss in further detail. In addition, a control that allows users to import the knowledge repository schema into the packet export rules database will be discussed.

Prior to mapping packet content/context to database table fields, users import the database schema into the packet export rules database via the knowledge repository schema import control. The import control contains two buttons and two panes. To import the knowledge repository schema into packet export rules database, users should press the import button. The tables of the knowledge repository are displayed in the left pane, while the fields of the currently selected table are displayed in the right panes as shown in FIG. 40. Users may browse the fields of any table by selected the appropriate table via the mouse or arrow keys. The database tables and fields may be proceeded by a status icon. New tables and fields, i.e., those that were not present in the knowledge repository during the previous import, are flagged by a green plus icon. Obsolete tables and fields, i.e., those that were deleted from the knowledge repository since the previous import, are flagged by a red letter 'x' icon. Modified fields, i.e., those whose type and/or attributes have changed since the previous import, are flagged by a yellow checkmark icon. To delete obsolete the schema of obsolete tables and fields, users should press the purge button.

Figure 41:
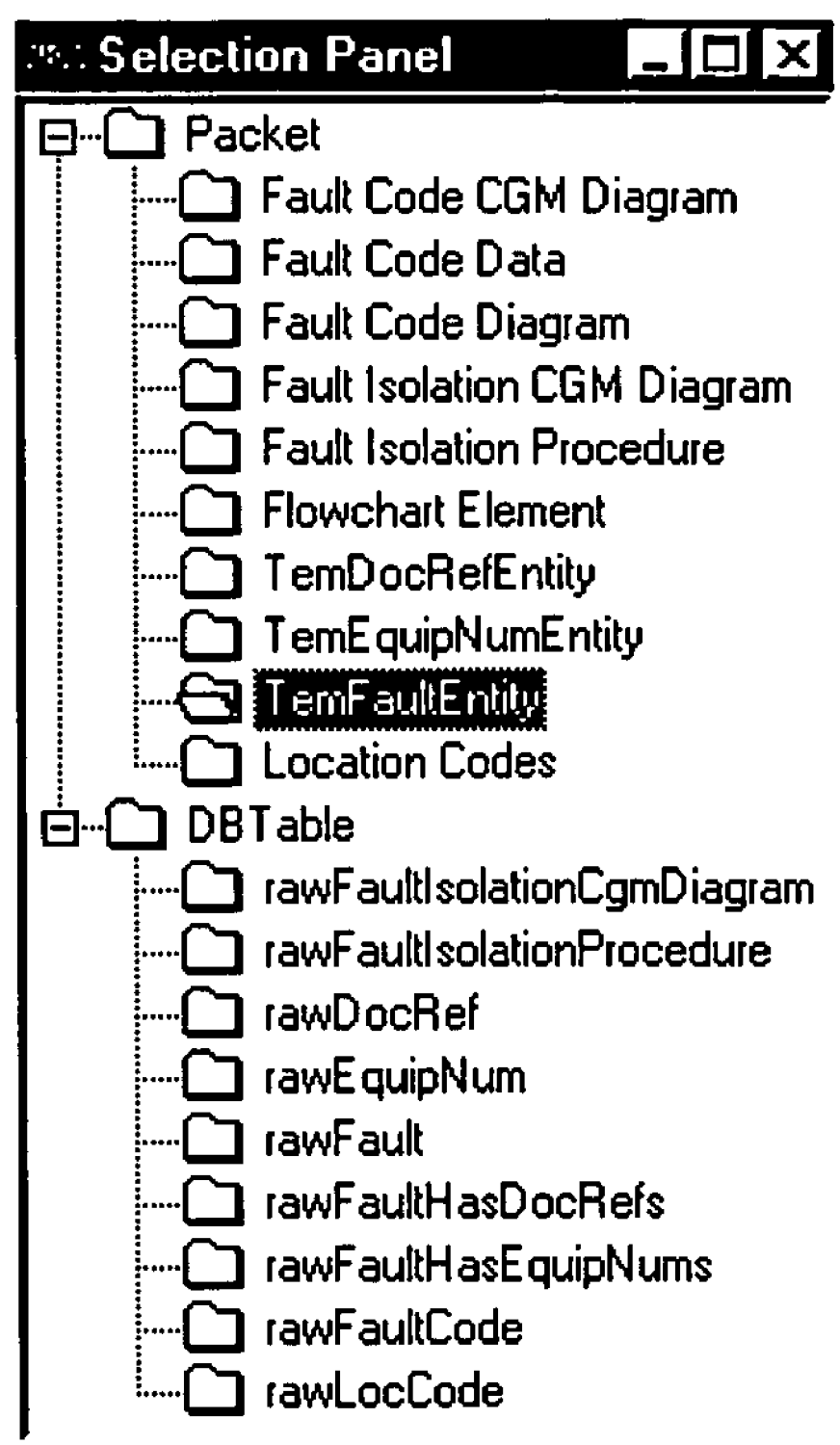
FIG. 41 is a screen capture of one embodiment a packet export selection panel.

The selection panel displays two lists in a tree view as shown in FIG. 41. The first list displays the packets that are known to system, i.e., the packets that are registered in the packet dictionary. The second list displays the knowledge repository tables. To display a packet or a table in the graphics panel, users should double-click the corresponding item in the tree view. If the user double-clicks a packet, which has rules that map it to one or more tables, then the mapped tables, along with the mapping rules, are also displayed in the graphics panel.

Figure 42:
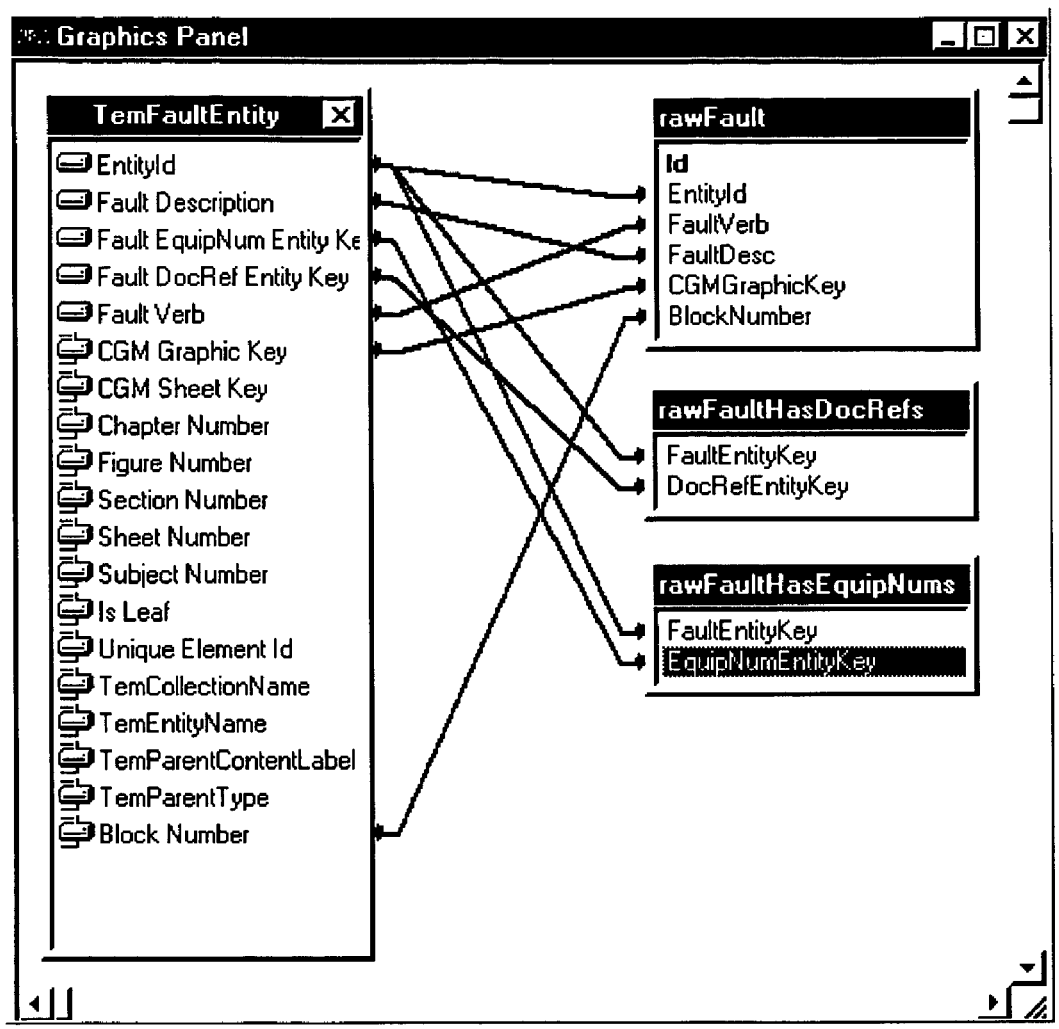
FIG. 42 is a screen capture of one embodiment of a graphics panel.

The graphics panel, as shown in FIG. 42, is a canvas, on which packet export rules may be created, modified or deleted. Packets are represented as windows. The packet type is displayed in the window's title bar. The content and context labels are listed inside the window. Content and context labels are proceeded by different icons. In a similar fashion, knowledge repository tables are represented as windows. The table name is displayed in the window's title board and the table fields are listed inside the window.

To add a packet or table to the canvas, double-click on the corresponding items in the selection panel. If the user double-clicks a packet, which has rules that map it to one or more tables, then the mapped tables, along with the mapping rules, are also displayed in the graphics panel. To remove a packet or table from the canvas, click on the small 'x' button in the upper right hand corner of the packet or table window. If a packet is removed from the canvas, all rules that are mapped to it are removed as well. Table windows can only be removed as long as there are no rules mapped to them; hence, one map first remove the packet windows that are mapped to the table windows. Removing windows and rules from the canvas does not delete them. The corresponding packet export rules still exist in the packet export rules database.

To create a new packet export (mapping) rule between a packet and a database table, user must first select a content or context label in the packet window by clicking on it and then select a field in a database table window by clicking on it. Once the aforementioned procedure is performed, the packet export user interface draws a line between the two selected items to represent the mapping rule. To create another export rule with the recently selected context or content label, double click the label in the packet window and then select a new database table field.

When a user clicks the left or right mouse button on a mapping rule, i.e., a line, the line is displayed in bold to indicate that the rule has been selected. This enables the users to either change the rule's attribute or to delete it. When rules are created, their expansion method is set to "level" and the packet content/context is not required in order to export a record set to the knowledge repository. If, however, the corresponding packet and database table, which the rules maps, already has a rule, i.e., a line is already drawn between them, then the expansion level is set to that of the existing rule. In one embodiment, rules whose expansion method are "level", are drawn in one color; whereas, rules, whose expansion method are "full", are drawn in different color. When the user changes the expansion method of a rule that maps a packet and a database, the expansion method of all rules between this packet and database table is changed. Finally, if the user right clicks anywhere on the canvas, with the exception of packet windows, database table windows and rules, a pop-up menu appears that allows the user to save the mapping rules to the packet export rules database.

Repositories. In the following sections, the D2K databases will be discussed in the following order: import filter rules repository, packet dictionary repository, processing module repository, packet dispatch rules, packet repository, text extraction rules repository, packet export rules repository, message log repository and knowledge base. Each database will be briefly described.

In one embodiment, users do not directly edit the data stored in D2K databases. Instead, users interact with the D2K user interfaces, which, in turn, will modify the contents of the databases.

Import Filter Rules Repository. The _Action table stores the packet construction rule actions, i.e., ignore the data, ignore the data and create a new packet, create a new packet and insert the data into the packet as content, insert the data into the current packet as content, append the data into the current packet as content, and insert the data into the current packet as context.

The _FieldType table stores the full and abbreviated names of the data fields. In the case of the SGML import filter, the data fields are either elements or attributes.

The _IdMap, _Lineage and _Workspace tables are created during the import of the data structure and the registration of the packets by the import filter rules. The _Lineage table caches a map of each nodes descendents in order facilitate the inheritance of context.

The PacketType, ContextLabel and ContentLabel tables stored the packet types, content labels and context labels of the packets, which are created by the packet construction rules.

The DocumentStructure table is a temporary buffer in which the structure of a data source is stored and processed.

The PacketConstruction table stores the packet construction rules. The data in table is created by the process that imports the structure of the input data source and is modified by the import filter user interface.

Figure 43:
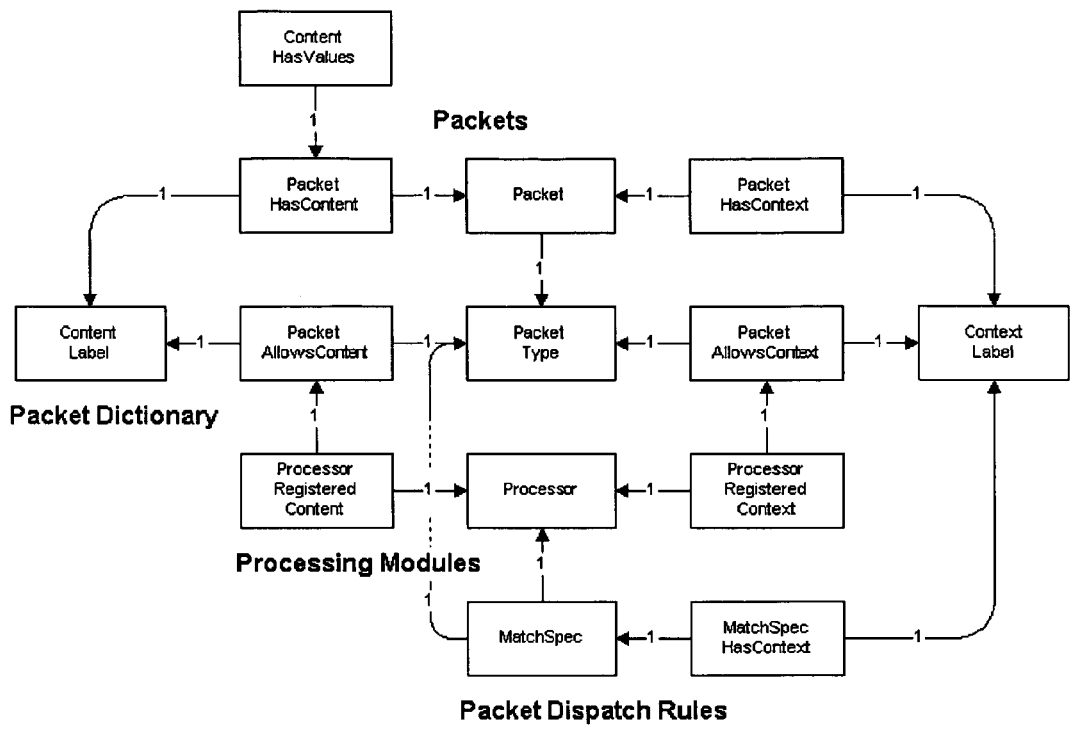
FIG. 43 is a block diagram illustrating the relationships between the packets, packet dictionary, processing modules, and packet dispatch rules databases.

Packet Dictionary Repository. In one embodiment, the packet dictionary database consists of six tables, one of which is a temporary workspace. The five main tables are PacketType, ContentLabel, ContextLabel, PacketAllowsContent and PacketAllowsContext. The data in these tables specify prototypes of legal packets. Several vital D2K functions use the packet dictionary. For instance, the D2K training user interfaces use the packet dictionary to limit list box selections in order to prohibit the user from generating invalid training rules, while the packet factory uses the packet dictionary to guarantee that only legal packets are created. In addition, several other databases contain links to the packet dictionary tables as shown in FIG. 43.

The _PrototypeRegistration table is a workspace, which is used by several D2K components to construct packet prototypes. The packet prototypes are then registered with the packet dictionary.

The PacketType, ContentLabel and ContextLabel tables store the legal packet types, content labels and context labels. The PacketAllowsContent and PacketAllowsContext tables specifies which content and context labels are legal in which packets.

Processing Module Repository. The processing module repository stores a list of registered processing modules as well as the information needed to invoke them. This information is stored in the Processor table. In addition, this repository stores which packets each processing module can generate. This information is stored in the ProcessorRegisteredContent and ProcessorRegisteredContext tables. In one embodiment, although the import filter is not a processing module, this repository stores which packets the import filter can generate as well.

Packet Dispatcher Rules Repository. The packet dispatcher rules repository stores the packet dispatch rules. The match specifications (matchspecs) are stored in the MatchSpec and MatchSpecHasContext tables. The Workspace table is a temporary workspace used by the packet dispatch user interface.

Packet Repository. The packet repository is a database where packets may be persisted. The packet dispatcher will persist packets in the repository if the user sets the "Save Packets in Database" checkbox on the Executive | Setting web page. Packets are stored in four tables: Packet, PacketHasContent, ContentHasValues and PacketHasContext.

Figure 44:
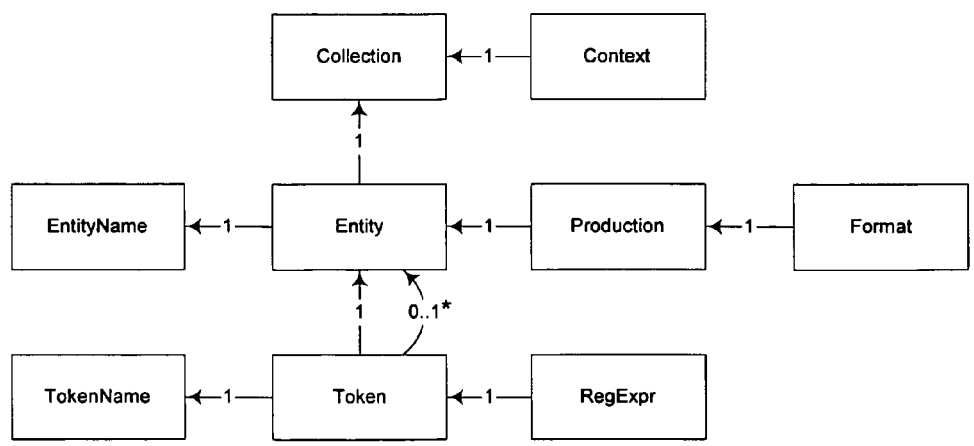
FIG. 44 is an entity relationship diagram of the schema for one embodiment of the text extraction rules database.

The text extraction rules repository stores the text extraction rules. The text extraction rules schema is shown in FIG. 44. Note the relationship between tokens and entities. Every token has a relationship to its parent entity. The straight line shows this relationship. Recall, however, that tokens may either consist of one or more regular expressions or they may be previously found entities. If a token falls in the latter case, then the option relationship, i.e., the curved line, will be non-null and reference a previously found entity.

Figure 45:
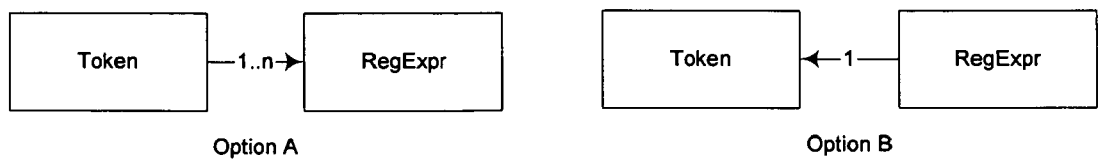
FIG. 45 illustrates two methods of representing a "one to many" relationship.

Since collections have one or more entities, entities have one or more tokens, tokens have more or more regular expressions, etc., a decision had to be made as to how implement these one-to-many relationships. Two common representations are shown in FIG. 45. To explain these representations, consider the token and regular expression entities. Tokens may have one or more regular expressions, e.g., a document volume token may have regular expressions such as "FIM," "(MM)|(AMM)", and "(WM)|(WDM)". The aforementioned example implies a one-to-many mapping as depicted by Option A of FIG. 45. An alternative mapping is that each regular expression is associated with one token as depicted in Option B of FIG. 45. The advantage of the first approach is that regular expressions may be reused by different tokens; whereas, the disadvantage is that an additional database table is needed to store the relationships. The advantage of the second approach is that the relationships do not need to be stored in a separate database table; whereas, the disadvantage of this approach is that the database may contain duplicate data if the same regular expression is referenced by more than one token. Due to a non-technical constraint, the inventors chose the latter approach, i.e., Option B.

The _BinExpansionMethod table is a lookup table that contains the legal values of the bin expansion type, i.e., "level" and "full".

The _Prototypes table is a workspace, which the text extraction module uses to construct the prototypes of packets that it can generate.

The Collection, Entity, Token, RegExpr, Production and Format tables stored collections, entities, tokens, regular expressions, productions and formats respectively.

The EntityName and TokenName tables store the names of entities and tokens. Both the Entity and Token tables reference entities and tokens respectively from these tables. These names are separated into their own table in order to support the accurate reuse of entity names by collections and token names by entities.

The CollectionProcessesPacketContent table stores lists of which packet content are processed by which collection. To be more precise, the text extraction modules processes the values of the specified packet content according to the specified collection of rules.

Packet Export Rules Repository. The packet export rules repository stores the packet export rules. The packet export module behavior is governed by these rules, which map packet content and context to fields of database tables. Just as the structure of the input data must be outlined and imported into the import filter rules repository prior to training the packet construction rules, the schema of the knowledge repository must be analyzed and imported into the packet export rules repository prior to training the packet export rules.

The _ExpansionMethod table is a lookup table that contains the legal values of the bin expansion type, i.e., "level" and "full".

The BufDBField and BufDBTable tables are temporary buffers in which the schema of a knowledge base is stored and processed. The data in these tables is compared to the data in the DBTable and DBField tables in order to determine which tables and/or fields have been added, deleted or modified since the last import of knowledge repository schema.

The DBTable and DBField tables store the schema of the knowledge base. Both of these tables have IsAdded and IsRemoved fields to flags differences between schema imports. In addition, the DBField table has an IsModified field as well.

The MapPacketType2 DBTable and MapPacketInfo2 DBField tables store the packet export mapping rules. The MapPacketType2 DBTable table stores a list of which packets are mapped to which database tables. In addition, the value expansion method is stored in this table. The MapPacketInfo2 DBField table stores a list of which packet content/context are mapped to which database table fields. In addition, the flag that specifies if a content or context value is required to export a record set is stored in this table.

Message Log Repository. D2K persists error, warning and debug messages in the message log repository. The message log has three tables. The ModuleType table stores a list of D2K components, which can generate messages. The Severity table stores a list of error classes such as fatal, error, warning, message and debug. Finally, the MessageLog tables stores the messages.

Knowledge Base. The schema of the knowledge repository is specific to each D2K application. Prior to training the packet export module, the knowledge repository schema is imported into the packet export rules repository. Once imported, users may train the packet export module to export record sets, which consists of the values of packet content and context.

Hardware and Operating Environment

Figure 46:
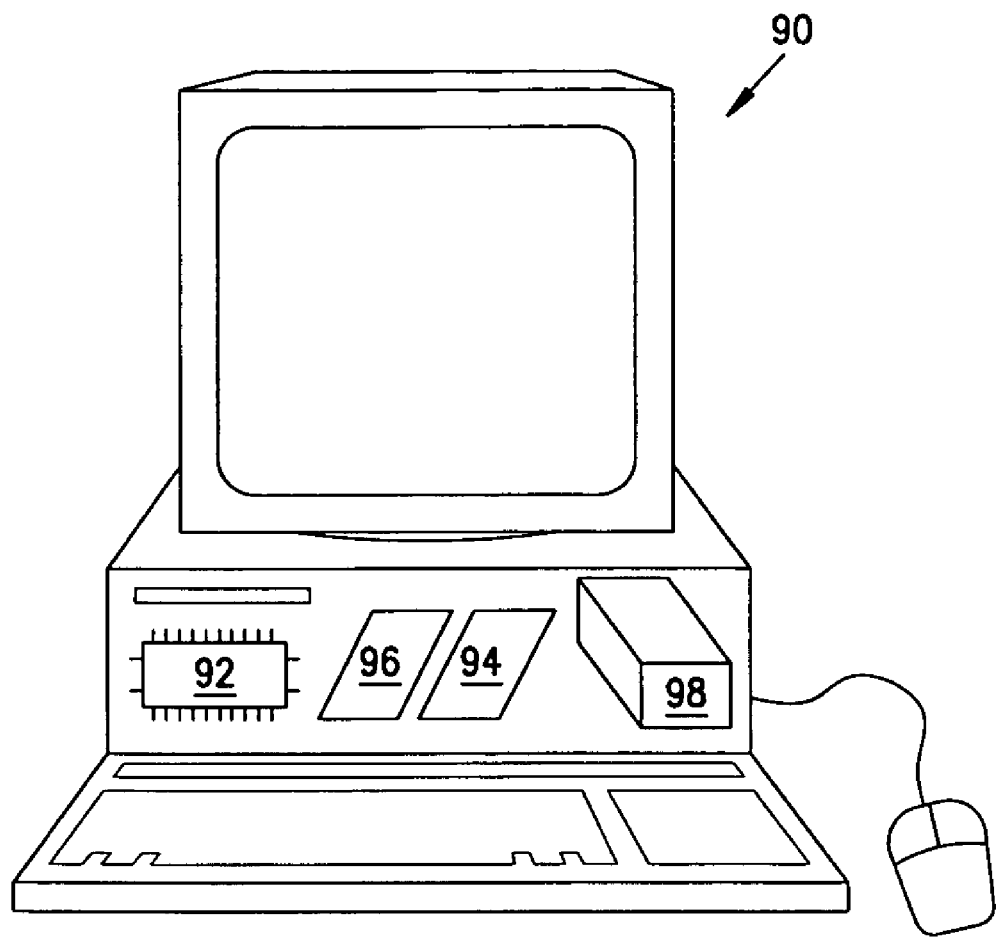
FIG. 46 is a block diagram of a computerized system in conjunction with which example embodiments of the invention may be implemented.

FIG. 46 is a block diagram of a computerized system in conjunction with which example embodiments of the invention may be implemented. Computer 90 includes a processor 92, random-access memory (RAM) 94, read-only memory (ROM) 96, and one or more storage devices 98, such as a hard disk drive, a floppy disk drive (into which a floppy disk can be inserted), an optical disk drive, a tape cartridge drive and the like. RAM 94 and ROM 96 are collectively referred to as the memory of computer. The memory, hard drives, floppy disks, CD-ROMs, and the like, are types of computer-readable media. The computer-readable media store instructions for execution by the processor 92. The instructions are provided to the processor 92 over a bus. The invention is not particularly limited to any type of computer 90. The construction and operation of such computers are well known within the art.

In one embodiment, a Data-to-Knowledge (D2K) translator is incorporated into software executing on a computer, such as the computer 90. In one embodiment, the D2K system is implemented in software using the C++ computer language and packaged as a collection of component object model (COM) components, which are instantiated in a web browser and connected via Microsoft Visual Basic® and Java® scripts embedded in HTML web pages. Those skilled in the art will recognize, however, that other comparable hardware and programming languages may be employed without diverting from the scope of the present invention.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof.

What is claimed is:

1. A computerized system comprising:
   at least one repository to store user-specified rules that govern the processing of data by the computerized system;
   an import filter to receive source data and to generates, based on the user-specified rules, neutral data, wherein the import filter supports a variety of source data formats;
   at least one processing module to process the neutral data according to the user-specified rules and to generate knowledge from the neutral data; and
   a user interface to allow a user to create, modify, and delete the user-specified rules.

2. The computerized system of claim 1 further comprising a system executive to control the at least one repository and the at least one processing module.

3. The computerized system of claim 1 wherein the at least one processing module is a text extraction module.

4. The computerized system of claim 1 wherein the at least one processing module is a packet export module.

5. The computerized system of claim 1, wherein the import filter is to convert data into a neutral format.

6. The computerized system of claim 1 further comprising an export module to export the knowledge into a knowledge repository.

7. The computerized system of claim 1, wherein the at least one processing module is generate a child packet from the at least one packet, the at least one processing module to assign a context stored in the at least one context field of the at least one packet to an at least one context field of the child packet.

8. A computerized system comprising:
   at least one repository to store user-specified rules that govern the processing of data by the computerized system;
   an import filter to receive source data and to generate at least one packet based on import filter rules of the user-specified rules, wherein the at least one packet comprises at least one context field that augments content meaning of the data, and wherein the import filter can support a variety of source data formats; and
   at least one processing module to process data in the at least one packet according to packet construction rules of the user-specified rules and to generate knowledge from the data in the at least one packet.

9. The computerized system of claim 8 further comprising a system executive to control the at least one repository and the at least one processing module.

10. The computerized system of claim 8, wherein the at least one processing module is configured to generate packets having a neutral data format based on the packet construction rules.

11. The computerized system of claim 8, wherein the data is a hierarchically structured data and wherein a packet construction rule of the packet construction rules is associated with a node of a data hierarchy for the hierarchically structured data.

12. A computerized system comprising:
at least one repository to store user-specified rules that govern the processing of data by the computerized system;
a filter to receive source data and to convert the source data into a neutral form and to store the converted data into at least one packet based on packet construction rules of the user-specified rules, wherein the filter can support a variety of source data formats; and
at least one processing module to process data in the at least one packet according to text extraction rules of the user-specified rules and to generate knowledge from the data.

13. The computerized system of claim 12, wherein the data is an input text and wherein the at least one processing module is to identify user-specified text entities within the input text based on the text extraction rules.

14. The computerized system of claim 13, wherein the at least one processing module is to format the identified user-specified text entities based on the text extraction rules.

15. The computerized system of claim 12 further comprising a system executive to control the at least one repository and the at least one processing module.

16. A computerized system comprising:
at least one repository to store user-specified rules that govern the processing of data by the computerized system; and
an import filter to receive source data and to generate at least one packet based on Packet construction rules of the user-specified rules, wherein the at least one packet comprises at least one content field for storage of the source data and at least one context field that augments content meaning of the data, and wherein the import filter can support a variety of source data formats;
at least one processing module to process data in the at least one packet according to packet export rules of the user-specified rules and to generate knowledge from the data in the at least one packet.

17. The computerized system of claim 16 further comprising a system executive to control the at least one repository and the at least one processing module.

18. The computerized system of claim 16, wherein the at least one processing module is configured to map content of a packet to a field of a database table based on the packet export rules.

19. The computerized system of claim 16, wherein the at least one processing module is configured to map context of a packet to a field of a database table based on the packet export rules.

20. A computerized system comprising:
at least one repository to store user-specified rules that govern the processing of data by the computerized system;
an import filter to receive source data and to generate at least one packet based on packet construction rules of the user-specified rules, wherein the at least one packet comprises at least one context field that augments content meaning of the data, and wherein the import filter can support a variety of source data formats; and
at least one processing module to process data in the at least one packet according to packet dispatch rules of the user-specified rules and to generate knowledge from the data in the at least one packet.

21. The computerized system of claim 20 further comprising a system executive to control the at least one repository and the at least one processing module.

22. The computerized system of claim 20, wherein the at least one processing module is configured to route a packet to at least one other processing module based on the packet dispatch rules.

23. The computerized system of claim 22, wherein the at least one processing module is configured to save a packet in a packet repository that is routed to the at least one other processing module.

24. A computerized method of translating data to knowledge, the computerized method comprising:
providing user-specified rules to govern the behavior of a computerized system for translating data to knowledge;
receiving data;
generating at least one packet for storage of the data based on the user-specified rules, wherein the at least one packet comprises at least one context field that augments content meaning of the data; and
processing data in the at least one packet according to the user-specified rules to generate knowledge, wherein ones of the user-specified rules are packet construction rules.

25. The computerized method of claim 24 further comprising data according to additional rules without modifying the existing processing components.

26. The computerized method of claim 24 wherein processing data according to the rules further comprises extracting text from the data.

27. The computerized method of claim 24 wherein processing data according to the rules further comprises exporting the knowledge to a knowledge repository.

28. The computerized method of claim 24 wherein processing data according to the rules further comprises converting data into a neutral format.

29. A computerized method of translating data to knowledge, the computerized method comprising:
providing user-specified rules to govern the behavior of a computerized system for translating data to knowledge;
receiving data, wherein the received data can be in one of a variety of supported formats;
generating at least one packet for storage of the data based on the user-specified rules, wherein the at least one packet comprises at least one context field that augments content meaning of the data; and
processing data in the at least one packet according to the user-specified rules to generate knowledge, wherein ones of the user-specified rules are packet dispatch rules.

30. The computerized method of claim 29, wherein processing the data according to the user-specified rules to generate knowledge comprises routing a packet to at least one processing module based on the packet dispatch rules.

31. The computerized method of claim 30, wherein processing the data according to the user-specified rules comprises saving a packet in a packet repository that is routed to the at least one processing module.

32. A computerized method of translating data to knowledge, the computerized method comprising:
providing user-specified rules to govern the behavior of a computerized system for translating data to knowledge;
receiving data, wherein the received data can be in one of a variety of supported formats;
converting the data into a neutral form;
storing the converted data into at least one packet based on the user-specified rules; and processing data according to the user-specified rules to generate knowledge, wherein ones of the user-specified rules are text extraction rules.

33. The computerized method of claim 32, wherein the data is an input text and wherein processing the data according to the user-specified rules to generate knowledge comprises identifying user-specified text entities within the input text based on the text extraction rules.

34. The computerized method of claim 33, wherein processing the data according to the user-specified rules to generate knowledge comprises formatting the identified user-specified text entities based on the text extraction rules.

35. A computerized method of translating data to knowledge, the computerized method comprising:
providing user-specified rules to govern the behavior of a computerized system for translating data to knowledge;
receiving data, wherein the received data can be in one of a variety of supported formats;
generating at least one packet for storage of the data based on the user-specified rules, wherein the at least one packet comprises at least one content field for storage of the data and at least one context field that augments content meaning of the data; and
processing data according to the user-specified rules to generate knowledge, wherein ones of the user-specified rules are packet export rules.

36. The computerized method of claim 35, wherein processing the data according to the user-specified rules to generate knowledge comprises mapping content of the packet to a field of a database table based on the packet export rules.

37. The computerized method of claim 35, wherein processing the data according to the user-specified rules to generate knowledge comprises mapping context of the packet to a field of a database table based on the packet export rules.

38. A computer readable medium having computer-executable instructions stored thereon for executing a method of translating data to knowledge, the computerized method comprising:
receiving data in an unstructured form, wherein the unstructured form is one of a variety of supported unstructured forms;
converting the data to a neutral form;
processing data according to user-specified rules to translate the data from the neutral form to knowledge; and
exporting the knowledge to a knowledge repository.

39. The computer readable medium of claim 38 wherein converting the data to a neutral form comprises applying user-specified packet construction rules to the data.

40. The computer readable medium of claim 38 wherein processing data according to user-specified rules comprises applying user-specified packet dispatch rules to the data to route the packets to a packet processing module.

41. The computer readable medium of claim 38 wherein processing data according to user-specified rules comprises applying user-specified text extraction rules to the data.

42. The computer readable medium of claim 38 wherein exporting the data to the knowledge repository comprises applying user-specified packet export rules to the data.

* * * * *